US011658778B2

(12) United States Patent
Fehrenbach et al.

(10) Patent No.: US 11,658,778 B2
(45) Date of Patent: May 23, 2023

(54) DATA TRANSMISSION IN A WIRELESS COMMUNICATION SYSTEM WITH REDUCED LATENCY

(71) Applicant: Fraunhofer-Gesellschaft zur Foerderung der angewandten Forschung e.V., Munich (DE)

(72) Inventors: Thomas Fehrenbach, Berlin (DE); Baris Goektepe, Berlin (DE); Cornelius Hellge, Berlin (DE); Thomas Schierl, Berlin (DE); Yago Sánchez De La Fuente, Berlin (DE); Dennis Wieruch, Berlin (DE); Bernd Holfeld, Berlin (DE); Thomas Wirth, Kleinmachnow (DE); Thomas Haustein, Potsdam (DE); Lars Thiele, Berlin (DE); Martin Kurras, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 112 days.

(21) Appl. No.: 16/240,039

(22) Filed: Jan. 4, 2019

(65) Prior Publication Data

US 2019/0140792 A1 May 9, 2019

Related U.S. Application Data

(63) Continuation of application No. PCT/EP2017/066968, filed on Jul. 6, 2017.

(30) Foreign Application Priority Data

Jul. 7, 2016 (EP) .................................... 16178450

(51) Int. Cl.
*H04L 5/00* (2006.01)
*H04L 1/00* (2006.01)
(Continued)

(52) U.S. Cl.
CPC .......... *H04L 5/0044* (2013.01); *H04L 1/0003* (2013.01); *H04L 1/0061* (2013.01);
(Continued)

(58) Field of Classification Search
None
See application file for complete search history.

(56) References Cited

U.S. PATENT DOCUMENTS

2008/0089281 A1 4/2008 Yoon et al.
2013/0034075 A1 2/2013 Zang et al.
(Continued)

FOREIGN PATENT DOCUMENTS

CN 102420685 A 4/2012
CN 104158620 A 11/2014
(Continued)

OTHER PUBLICATIONS

"Candidate NR Multiple Access Schemes", R1-163510; 3GPP TSG-RAN WG1 #84b; Apr. 11-15, 2016; Busan, Korea, 8 pages.
(Continued)

*Primary Examiner* — Scott M Sciacca
(74) *Attorney, Agent, or Firm* — Perkins Coie LLP; Michael A. Glenn

(57) ABSTRACT

A receiver receives and processes a data signal having at least one data signal block. The data signal block has a number of symbols in the time domain and a number of sub-carriers in the frequency domain. The data signal block includes a control region to provide control data to the
(Continued)

receiver and a payload region to provide payload data to the receiver. Payload data is allocated to the control region of the data signal block.

16 Claims, 18 Drawing Sheets

(51) Int. Cl.

| | |
|---|---|
| ***H04W 72/04*** | (2023.01) |
| ***H04L 27/34*** | (2006.01) |
| ***H04W 72/23*** | (2023.01) |
| ***H04L 1/1607*** | (2023.01) |
| ***H04L 1/1812*** | (2023.01) |

(52) U.S. Cl.
CPC .......... *H04L 1/1614* (2013.01); *H04L 1/1816* (2013.01); *H04L 5/0046* (2013.01); *H04L 5/0053* (2013.01); *H04L 5/0064* (2013.01); *H04L 5/0094* (2013.01); *H04L 27/3488* (2013.01); *H04W 72/23* (2023.01); *H04L 5/0007* (2013.01)

(56) References Cited

U.S. PATENT DOCUMENTS

| | | | | |
|---|---|---|---|---|
| 2013/0094458 | A1* | 4/2013 | Sartori | H04W 72/14 370/329 |
| 2015/0009952 | A1 | 1/2015 | Berggren et al. | |
| 2015/0295688 | A1 | 10/2015 | Pan et al. | |
| 2015/0341156 | A1 | 11/2015 | Yang et al. | |
| 2015/0358111 | A1 | 12/2015 | Marinier et al. | |
| 2016/0094372 | A1* | 3/2016 | Jitsukawa | H04L 5/0092 375/322 |
| 2016/0134458 | A1 | 5/2016 | Xia et al. | |
| 2016/0143030 | A1 | 5/2016 | Lee et al. | |
| 2017/0054479 | A1* | 2/2017 | Sang | C07D 413/10 |
| 2017/0223687 | A1* | 8/2017 | Kuchibhotla | H04L 5/0094 |
| 2017/0265060 | A1* | 9/2017 | Bin Sediq | H04L 27/3488 |
| 2017/0280429 | A1* | 9/2017 | Shen | H04W 72/0406 |
| 2019/0081688 | A1* | 3/2019 | Deenoo | H04B 7/088 |

FOREIGN PATENT DOCUMENTS

| | | | |
|---|---|---|---|
| CN | 104885534 | A | 9/2015 |
| CN | 104919772 | A | 9/2015 |
| EP | 1906611 | A1 | 4/2008 |
| EP | 2553852 | A2 | 2/2013 |
| EP | 2985936 | A1 | 2/2016 |
| JP | 2010500789 | A | 1/2010 |
| JP | 2016509784 | A | 3/2016 |
| JP | 2016067030 | A | 4/2016 |
| JP | 6800439 | B2 | 11/2020 |
| RU | 2462823 | C2 | 9/2012 |
| WO | 2011122837 | A2 | 10/2011 |
| WO | 2015000917 | A2 | 1/2015 |
| WO | 2016048580 | A2 | 3/2016 |
| WO | 2016067110 | A1 | 5/2016 |

OTHER PUBLICATIONS

"Initial views and evaluation results on non-orthogonal multiple access for NR uplink", R1-163111; 3GPP TSG RAN WG1 Meeting #84bis; Busan, Korea; Apr. 11-15, 2016; 6 pages.

"Overview of non-orthogonal multiple access for 5G", R1-162153; Huawei, HiSilicon; 3GPP TSG RAN WG1 Meeting #84bis; Busan, Korea, Apr. 2016, 8 pages.

Huawei, HiSilicon, Remaining details for the PDSCH starting symbol in TM10, 3GPP TSG-RAN WG1#71, R1-124696, Nov. 3, 2012, Nov. 3, 2012.

Qualcomm Incorporated, R1-164458, DL channel design for shortened TTI, 3GPP TSG RAN WG1 #85, 3GPP server publication date May 14, 2016.

Qualcomm Incorporated, R1-164458, DL channel design for shortened TTI, 3GPP TSG RAN WG1 #85, 3GPP server publication date May 14, 2016., May 14, 2016.

Nokia, Alcatel-Lucent Shanghai Bell, R1-165027, Basic frame structure principles for 5G, 3GPP TSG-RAN WG1#85, Nanjing, P.R. China May 23-27, 2016, May 2016.

R3-160373 "RNSAP Rapporteur Update": 509 3GPP TSG-RAN WG3 Meeting #91 St. Julien, Malta, Feb. 15 -19, 2016.

Wang, Z., Dissertation: Research of Receiving Technologies for Communication Systems with Low-•precision Quantization, May 2014, China.

Lagunas, Miguel A., et al., DOA Detection Versus Combined Spatial Temporal Reference Beamforming T.S.C. Department. E.T. S.I. Telecomunicación Barcelona Spain.

3GPP R1-165072, Intel Corporation, Enhancements of Sidelink Physical Layer Structure for PC5 V2V Communication, 3GPP TSG RAN WG1 Meeting #85 R1-165072 Nanjing, China, May 23-27, 2016.

* cited by examiner

Fig. 4(a)

| | | | | |
|---|---|---|---|---|
| PDCCH dimensioning (10 MHz) | | | | |
| CFI | 1 | 2 | 3 | |
| PRBs | 50 | 50 | 50 | |
| Total REs | 600 | 1200 | 1800 | |
| RS REs (in OFDM symbol 0) | 200 | | | Assume 2 Tx antennas |
| PCFICH REs (in OFDM symbol 0) | 16 | | | 4 REGs |
| PHICH REs (in OFDM symbol 0) | 84 | | | Assume Ng = 1, PHICH groups = 7, then (7*3*4 = 84) |
| | | | | |
| PDCCH REs | 300 | 900 | 1500 | |
| #of CCEs | 8 | 25 | 41 | #of PDCCH REs / 36 |

Fig. 4(b)

| | | | | |
|---|---|---|---|---|
| PDCCH dimensioning (5 MHz) | | | | |
| CFI | 1 | 2 | 3 | |
| RBs | 25 | 25 | 25 | |
| Total REs | 300 | 600 | 900 | |
| RSs (in OFDM symbol 0) | 100 | | | Assume 2 Tx antennas |
| PCFICH (in OFDM symbol 0) | 16 | | | 4 REGs |
| PHICH (in OFDM symbol 0) | 48 | | | Assume Ng = 1, PHICH groups = 4, then (4*3*4 = 48) |
| | | | | |
| PDCCH | 136 | 436 | 736 | |
| #of CCEs | 3 | 12 | 20 | #of PDCCH REs / 36 |

| PDCCH dimensioning (20 MHz) | | | | |
|---|---|---|---|---|
| CFI | 1 | 2 | 3 | |
| RBs | 100 | 100 | 100 | |
| Total REs | 1200 | 2400 | 3600 | |
| RSs (in OFDM symbol 0) | 400 | | | Assume 2 Tx antennas |
| PCFICH (in OFDM symbol 0) | 16 | | | 4 REGs |
| PHICH (in OFDM symbol 0) | 156 | | | Assume Ng = 1, PHICH groups = 13, then (13*3*4 = 84) |
| | | | | |
| PDCCH REs | 628 | 1828 | 3028 | |
| #of CCEs | 17 | 50 | 84 | #of PDCCH REs / 36 |

available REs for control information in PDCCH

Fig. 4(c)

| Field Name | Length | Comments |
| --- | --- | --- |
| HARQ Process | 3 bit (FDD) 4(TDD) Range: 0-7 (FDD) 0-15(TDD) | This field indicates the HARQ process number used by the higher layers for the current PDSCH codeword. Each HARQ process number is closely associated with the New Data Indicator and Redundancy Version field |
| New Data Indicator | 1 bit Range: 0-1 | This field indicates the UE, if the codeword is a fresh transmission or a re-transmission. This field is toggled every time for a given HARQ process, if its a new transmission and its not toggled if its a retransmission. So the UE need to store this field for all previous HARQ processes to check if its a new or re-transmission |
| Redundancy Version | 2 bit Range: 0-3 | |
| User Data | 65-570 bits | Using remaining bits depending on CCE aggregation level and TDD/FDD operation. e.g. 1 CCE (FDD) 72 bits -(3+2+1) = 66 bits |

118 (HARQ Process, New Data Indicator, Redundancy Version)

120 (User Data)

| | Field Name | Length | Comment |
|---|---|---|---|
| 122 | Flag for format0/ format1A differentiation | 1 | |
| | Hopping flag | 1 | |
| | N_ULhop | 1 (1.4 Mhz)<br>1 (3 Mhz)<br>1 (5 Mhz)<br>2 (10 Mhz)<br>2 (15 Mhz)<br>2 (20 Mhz) | Applicable only when Hopping flag is set. (Refer to 36.213 Table 8.4-1 and Table 8.4-2)is. |
| | Resource block assignment | 5 (1.4 Mhz)<br>7 (3 Mhz)<br>7 (5 Mhz)<br>11 (10 Mhz)<br>12 (15 Mhz)<br>13 (20 Mhz) | See 36.213 8.1 |
| | MCS and RV | 5 | Modulation and Coding Scheme; Redundancy Version |
| | NDI (New Data Indicator) | 1 | |
| | TPC for PUSCH | 2 | See Power Control section |
| | Cyclic shift for DM RS | 3 | See 36.211 Table Table 5.5.2.1.1-1 |
| | UL index (TDD only) | 2 | This field is present only for TDD operation with uplink-downlink configuration 0 |
| | Downlink Assignment Index (DAI) | 2 | Only for TDD Operation with uplink-downlink configurations 1-6 |
| | CQI request (1 bit) | 1 | Refer to 36.213 Table 7.3-X |
| 118 | HARQ Process (DL data) | 3 bit (FDD)<br>4(TDD)<br>Range:<br>0-7 (FDD)<br>0-15(TDD) | This field indicates the HARQ process number used by the higher layers for the current PDSCH codeword. Each HARQ process number is closely associated with the New Data Indicator and Redundancy Version field |
| | New Data Indicator (DL data) | 1 bit<br>Range:<br>0-1 | This field indicates the UE, if the codeword is a fresh transmission or a re-transmission. This field is toggled every time for a given HARQ process, if its a new transmission and its not toggled if its a retransmission. So the UE need to store this field for all previous HARQ processes to check if its a new or re-transmission |
| | Redundancy Version (DL data) | 2 bit<br>Range: 0-3 | |
| 120 | User Data (DL) | Remaining bits | Using remaining bits depending on CCE aggregation level, Bandwidth, TDD/FDD operation… |

| | Field Name | Length | Comments |
|---|---|---|---|
| 124 | Resource Allocation Fields | Depending on method used | Resource allocation of CCEs, PRBs or REs within the PDCCH region or control region |
| 118 | HARQ Process | 3 bit (FDD) 4(TDD) Range: 0-7 (FDD) 0-15(TDD) | This field indicates the HARQ process number used by the higher layers for the current PDSCH codeword. Each HARQ process number is closely associated with the New Data Indicator and Redundancy Version field |
| | New Data Indicator | 1 bit Range: 0-1 | This field indicates the UE, if the codeword is a fresh transmission or a re-transmission. This field is toggled every time for a given HARQ process, if its a new transmission and its not toggled if its a retransmission. So the UE need to store this field for all previous HARQ processes to check if its a new or re-transmission |
| | Redundancy Version | 2 bit Range: 0-3 | |
| 125 | MCS | 5 | Modulation and coding scheme |
| | Precoding information (optional) | 0 (2 Antenna) 2 (4 Antenna) | Refer to 36.212 Table 5.3.3.1.5A-2 for the meaning of value in the field |
| | | | |
| | Downlink Assignment Index (optional) | 2 | Only Applicable to TDD uplink-downlink configuration 1-6. |
| | TPC command (optional) | 2 | This field indicates the transmission power for PUCCH on uplink |
| | Transport block to codeword swap flag (optional) | 1 | |

| Field Name | Length | Comments |
|---|---|---|
| Resource Allocation | 2 | 1: aggregation level 2<br>2: aggregation level 4<br>3: aggregatuin level 8<br>4: for future use |
| HARQ Process | 3 bit (FDD)<br>4(TDD)<br>Range:<br>0-7 (FDD)<br>0-15(TDD) | This field indicates the HARQ process number used by the higher layers for the current PDSCH codeword. Each HARQ process number is closely associated with the New Data Indicator and Redundancy Version field |
| New Data Indicator | 1 bit<br>Range:<br>0-1 | This field indicates the UE, if the codeword is a fresh transmission or a re-transmission. This field is toggled every time for a given HARQ process, if its a new transmission and its not toggled if its a retransmission. So the UE need to store this field for all previous HARQ processes to check if its a new or re-transmission |
| Redundancy Version | 2 bit<br>Range:<br>0-3 | |
| MCS | 5 | Modulation and coding scheme |

124' (Resource Allocation)
118 (HARQ Process, New Data Indicator, Redundancy Version)
125' (MCS)
123'

Fig. 8(a)

|   | CCE 0 | CCE 1 | CCE 2 | CCE 3 | CCE 4 | CCE 5 | CCE 6 | CCE 7 |
|---|---|---|---|---|---|---|---|---|
| A | ▨ | ▨ |   |   |   |   |   |   |
| B | ▨ | ▨ | ▨ | ▨ |   |   |   |   |
| C | ▨ | ▨ | ▨ | ▨ | ▨ | ▨ | ▨ | ▨ |

| | |
|---|---|
| ▨ | New DCI message for low latency UE (1 CCE) – QPSK modulation and blind decoding |
| ▨ | Data for low latency UE on remaining CCEs (1, 3, 7 CCEs depending on aggregation level) – modulation and coding according to DCI message in CCE 0 |

| | Field Name | Length | Comments |
|---|---|---|---|
| 124" | Resource Allocation Length | 2+ | Length in CCEs |
| 118 | HARQ Process | 3 bit (FDD) 4(TDD) Range: 0-7 (FDD) 0-15(TDD) | This field indicates the HARQ process number used by the higher layers for the current PDSCH codeword. Each HARQ process number is closely associated with the New Data Indicator and Redundancy Version field |
| | New Data Indicator | 1 bit Range: 0-1 | This field indicates the UE, if the codeword is a fresh transmission or a re-transmission. This field is toggled every time for a given HARQ process, if its a new transmission and its not toggled if its a retransmission. So the UE need to store this field for all previous HARQ processes to check if its a new or re-transmission |
| | Redundancy Version | 2 bit Range: 0-3 | |
| 125' | MCS | 5 | Modulation and coding scheme |

| Field Name | Length | Comments |
|---|---|---|
| RBG | 2 bit Range: 0-2 | Resource block group |
| Resource allocation | 17 | Resource allocation Bitmap with offset of RGB* ceil(50/3) |
| HARQ Process | 3 bit (FDD) 4(TDD) Range: 0-7 (FDD) 0-15(TDD) | This field indicates the HARQ process number used by the higher layers for the current PDSCH codeword. Each HARQ process number is closely associated with the New Data Indicator and Redundancy Version field |
| New Data Indicator | 1 bit Range: 0-1 | This field indicates the UE, if the codeword is a fresh transmission or a re-transmission. This field is toggled every time for a given HARQ process, if its a new transmission and its not toggled if its a retransmission. So the UE need to store this field for all previous HARQ processes to check if its a new or re-transmission |
| Redundancy Version | 2 bit Range: 0-3 | |
| MCS | 5 | Modulation and coding scheme |

124''' (RBG, Resource allocation)
118 (HARQ Process, New Data Indicator, Redundancy Version)
125' (MCS)
133

Fig. 11

| Field Name | Length | Comments |
|---|---|---|
| RBG | 2 bit<br>Range:<br>0-2 | Resource block group |
| Resource allocation | 17 | Resource allocation Bitmap with offset of RGB* ceil(50/3) |
| HARQ Process | 3 bit (FDD)<br>4(TDD)<br>Range:<br>0-7 (FDD)<br>0-15(TDD) | This field indicates the HARQ process number used by the higher layers for the current PDSCH codeword. Each HARQ process number is closely associated with the New Data Indicator and Redundancy Version field |
| New Data Indicator | 1 bit<br>Range:<br>0-1 | This field indicates the UE, if the codeword is a fresh transmission or a re-transmission. This field is toggled every time for a given HARQ process, if its a new transmission and its not toggled if its a retransmission. So the UE need to store this field for all previous HARQ processes to check if its a new or re-transmission |
| Redundancy Version | 2 bit<br>Range:<br>0-3 | |
| MCS | FFS | Modulation and Coding for MUST |

DATA TRANSMISSION IN A WIRELESS COMMUNICATION SYSTEM WITH REDUCED LATENCY

CROSS-REFERENCE TO RELATED APPLICATIONS

This application is a continuation of copending International Application No. PCT/EP2017/066968, filed Jul. 6, 2017, which is incorporated herein by reference in its entirety, and additionally claims priority from European Application No. EP16178450.9, filed Jul. 7, 2016, which is incorporated herein by reference in its entirety.

The present invention concerns the field of wireless communication systems, for example wireless mobile communication systems, in which data, also referred to as user data or payload data, is transmitted from a transmitter to one or more receivers, like mobile terminals. The transmitters may be base stations of the wireless communication system or other mobile terminals.

BACKGROUND OF THE INVENTION

FIG. 1 shows a schematic representation of an example of a wireless communication system including a plurality of base stations $eNB_1$ to $eNB_5$, each serving a specific area surrounding the base station schematically represented by the respective cells $\mathbf{100}_1$ to $\mathbf{100}_5$. The base stations are provided to serve mobile terminals that are present within a cell. FIG. 1 shows an exemplary view of only five cells, however, the wireless communication system may include more such cells. FIG. 1 shows two mobile terminals $UE_1$ and $UE_2$ that are in cell $\mathbf{100}_2$ and that are served by base station $eNB_2$. The arrows $\mathbf{102}_1$, $\mathbf{102}_2$ schematically represent uplink/downlink channels for transmitting data from a mobile terminal $UE_1$, $UE_2$ to the base stations $eNB_2$ or for transmitting data from the base station $eNB_2$ to the mobile terminal $UE_1$, $UE_2$, respectively. The wireless communication system may be an orthogonal frequency-division multiplexing (OFDM) system or an orthogonal frequency-division multiple access (OFDMA) system, as it is, for example, defined by the LTE standard or other multicarrier systems based on frequency-division multiplexing. In the current LTE standard, a transmission time interval (TTI) is defined as having a length 1 ms, and the TTI is the granularity at which the data may be mapped from higher layers to the physical layer (PHY) to perform the transmission. The mobile terminal processes the data that it receives with a granularity of 1 ms. The mobile terminal needs to be synchronized to the radio network. Control information are send each millisecond and processed by the mobile terminal to see whether some data has been sent to it, and, in an affirmative case, the mobile terminal has to decode the data channel.

An OFDMA system for data transmission makes use of an OFDMA-based physical resource grid which comprises a set of resource elements to which various physical channels and physical signals are mapped. For example, in accordance with the LTE standard, the physical channels may include the physical downlink shared channel (PDSCH) carrying user specific data, also referred to as downlink payload data, the physical broadcast channel (PBCH) carrying for example the master information block, the physical downlink control channel (PDCCH) carrying for example the downlink control information (DCI), etc. The physical signals may comprise reference signals (RS), synchronization signals and the like. The LTE resource grid comprises a 10 ms frame in the time domain having a given bandwidth in the frequency domain. The frame has 10 subframes of 1 ms length, and each subframe includes two slots of 6 or 7 OFDM symbols depending on the cyclic prefix (CP) length.

FIG. 2 shows an exemplary LTE OFDMA-based subframe with two antenna ports for different selected Tx antenna ports. The subframe includes two resource blocks (RB) each made up of one slot of the subframe and 12 subcarriers in the frequency domain. The subcarriers in the frequency domain are shown as subcarrier 0 to subcarrier 11, and in the time domain, each slot includes 7 OFDM symbols, e.g. in the slot 0 OFDM symbols 0 to 6 and in slot 1 OFDM symbols 7 to 13. A resource element is made up of one symbol in the time domain and one subcarrier in the frequency domain. The white boxes 106 represent resource elements allocated to the PDSCH carrying the payload or user data, also referred to a payload region. The resource elements for the physical control channels (carrying non-payload or non-user data), also referred to the control region, are represented by the hatched boxes 108. In accordance with examples, resource elements 108 may be allocated to the PDCCH, to the physical control format indicator channel (PCFICH), and to the physical hybrid ARQ indicator channel (PHICH). The cross-hatched boxes 110 represent resource elements which are allocated to the RS that may be used for the channel estimation. The black boxes 112 represent unused resources in the current antenna port that may correspond to RSs in another antenna port.

The resource elements 108, 110, 112 allocated to the physical control channels and to the physical reference signals are not evenly distributed over time. More specifically, in slot 0 of the subframe the resource elements associated with the symbol 0 and the symbol 1 are allocated to the physical control channels or to the physical reference signals, no resource elements in the symbols 0 and 1 are allocated to payload data. The resource elements associated with symbol 4 in slot 0 as well as the resource elements associated with symbols 7 and 11 in slot 1 of the subframe are allocated in part to the physical control channels or to the physical reference signals. The white resource elements shown in FIG. 2 may carry symbols associated with payload data or user data and in the slot 0 for symbols 2, 3, 5 and 6, all resource elements 106 may be allocated to payload data, while less resource elements 106 are allocated to payload data in symbol 4 of slot 0, and no resource element is allocated to payload data in symbols 0 and 1. In slot 1 the resource elements associated with symbols 8, 9, 10, 12 and 13 are all allocated to payload data, while for symbols 7 and 11 less resource elements are allocated to payload data.

The duration of the subframe is 1 ms, and in accordance with the LTE standard, the TTI is 1 ms. When transmitting data using the resource grid structure shown in FIG. 2, the receiver, for example the mobile terminal or mobile user, receives the resource elements depicted in FIG. 2 in 1 ms. The information contained or defined by the resource elements may be processed, and for each transmission, i.e. for each TTI having the 1 ms length, a constant number of payload data is received. The transmission scheme leads to an end-to-end latency of more than 1 ms, as the receiver first receives a transmission having a duration of 1 ms and then, once the transmission is completed, processes the control information to see whether some data has been sent to the receiver, and in case it is true, the receiver decodes the data channel of a length of 1 ms. Thus, the duration of the transmission and the processing time add up to a period exceeding 1 ms.

SUMMARY

An embodiment may have a receiver, wherein the receiver is configured to receive and process a data signal, the data signal including at least one data signal block, the data signal block having a number of symbols in the time domain and a number of sub-carriers in the frequency domain, wherein the data signal block includes a control region to provide control data to the receiver and a payload region to provide payload data to the receiver, and wherein payload data is allocated to the control region of the data signal block.

Another embodiment may have a transmitter, wherein the transmitter is configured to transmit a data signal, the data signal including at least one data signal block, the data signal block having a number of symbols in the time domain and a number of sub-carriers in the frequency domain, wherein the data signal block includes a control region to provide control data to a receiver and a payload region to provide payload data to the receiver, and wherein payload data is allocated to the control region of the data signal block.

According to another embodiment, a wireless communication system may have: a receiver, wherein the receiver is configured to receive and process a data signal, the data signal including at least one data signal block, the data signal block having a number of symbols in the time domain and a number of sub-carriers in the frequency domain, wherein the data signal block includes a control region to provide control data to the receiver and a payload region to provide payload data to the receiver, and wherein payload data is allocated to the control region of the data signal block; and a transmitter, wherein the transmitter is configured to transmit a data signal, the data signal including at least one data signal block, the data signal block having a number of symbols in the time domain and a number of sub-carriers in the frequency domain, wherein the data signal block includes a control region to provide control data to a receiver and a payload region to provide payload data to the receiver, and wherein payload data is allocated to the control region of the data signal block.

According to another embodiment, a method may have the steps of: providing for a receiver of a wireless communication system a data signal, the data signal including at least one data signal block, the data signal block having a number of symbols in the time domain and a number of sub-carriers in the frequency domain, wherein the data signal block includes a control region to provide control data to the receiver and a payload region to provide payload data to the receiver, and wherein payload data is allocated to the control region of the data signal block.

According to another embodiment, a non-transitory digital storage medium may have a computer program stored thereon to perform the inventive method.

BRIEF DESCRIPTION OF THE DRAWINGS

Embodiments of the present invention will be detailed subsequently referring to the appended drawings, in which:

FIG. 4*a-c* shows tables indicating the number of resource elements available for the PDCCH dependent on the bandwidth of the system and the desired dimension of the PDCCH being either one, two or three OFDM symbols, FIG. 4(*a*) showing a table the PDCCH dimensioning in a system having a bandwidth of 10 MHz, FIG. 4(*b*) showing a table the PDCCH dimensioning in a system having a bandwidth of 5 MHz, and FIG. 4(*c*) showing a table the PDCCH dimensioning in a system having a bandwidth of 20 MHz;

FIG. 5 shows a DCI message format in accordance with an embodiment of the present invention allowing to send payload data within the control region, the DCI message including the payload data;

FIG. 6 shows a DCI message in accordance with a further embodiment of the present invention, the DCI message, when compared to FIG. 5, including additional control information;

FIG. 7 shows a DCI message in accordance with a further embodiment of the present invention, the DCI message indicting where the payload data is allocated within the control region;

FIG. 8*a-c* shows an embodiment for the allocation of CCEs within the PDCCH or within the control region, but outside of the DCI message for providing the user payload data in the control region, FIG. 8(*a*) showing a DCI message indicating a CCE aggregation level, FIG. 8(*b*) illustrating the CCEs uses in accordance with the aggregation level, and FIG. 8(*c*) showing a DCI message indicating an actual resource allocation length;

FIG. 11 shows a DCI message in accordance with a further embodiment of the present invention, the DCI message indicting indicating an RBG and a resource allocation for the payload data;

FIG. 13 shows an embodiment using a DCI message which is similar to the one of FIG. 11 with a modified MCS section including information about the modulation and coding scheme used for the MUST

DETAILED DESCRIPTION OF THE INVENTION

In the following, advantageous embodiments of the present invention will be described in further detail with reference to the enclosed drawings in which elements having the same or similar function are referenced by the same reference signs.

Figure 1:
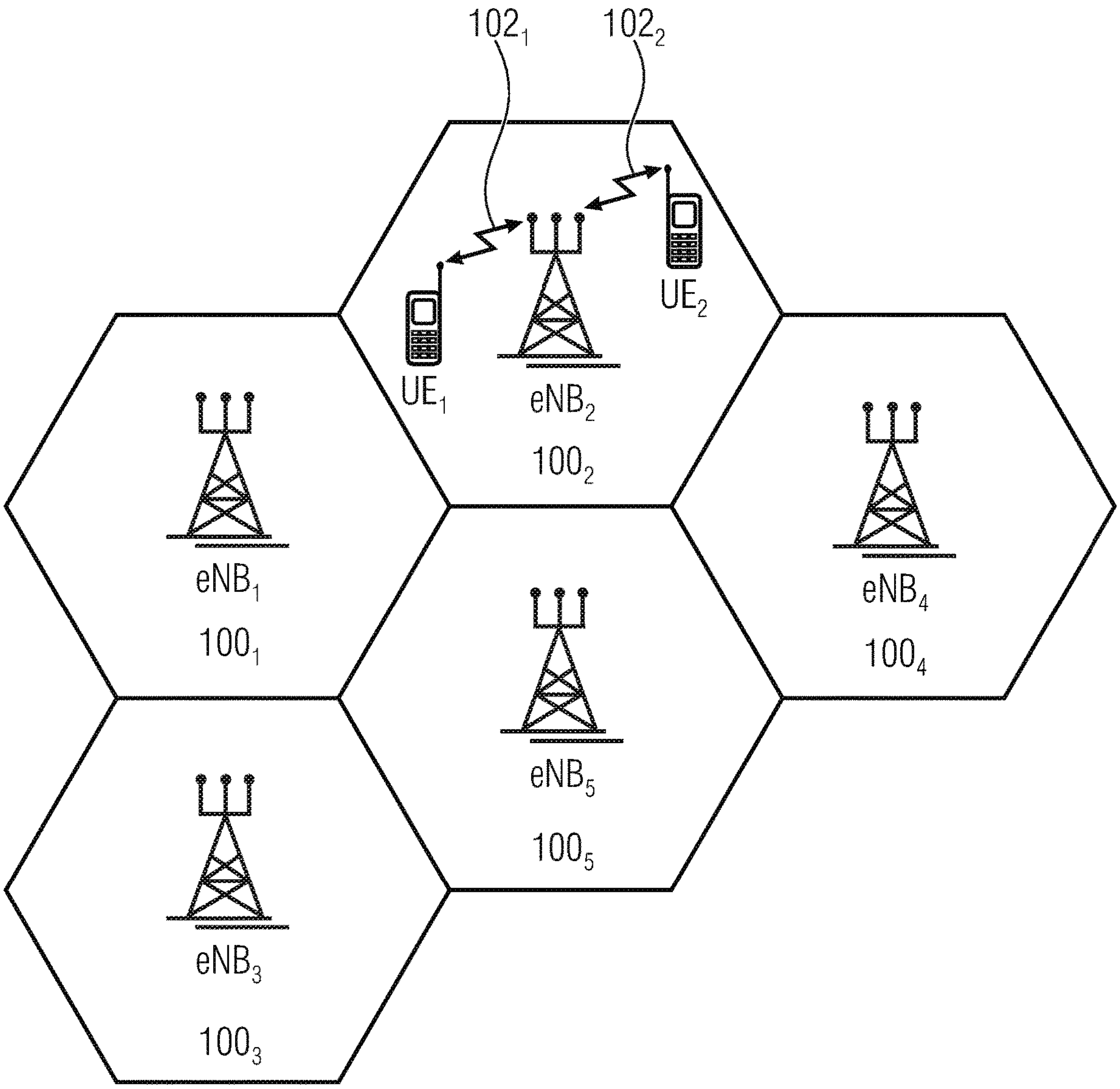
FIG. 1 shows a schematic representation of an example of a wireless communication system including a plurality of base stations.
Figure 2:
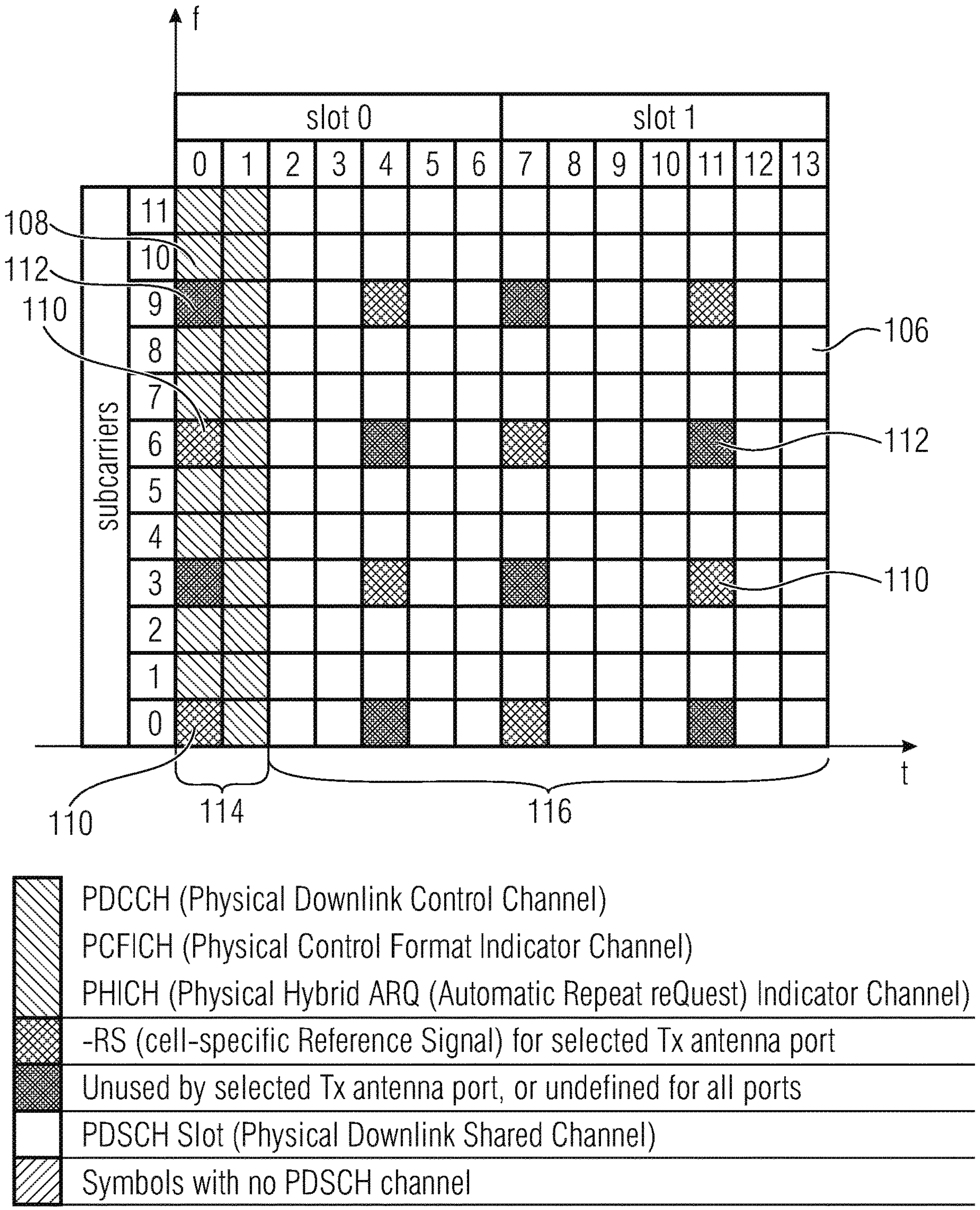
FIG. 2 shows an exemplary OFDMA-subframe for two antennas ports as it may be used for a conventional LTE downlink communication.

A data transmission in a wireless communication system, like an OFDMA system as depicted in FIG. 1, may use a resource grid structure as shown in FIG. 2. The TTI, also referred to as transmission interval, is selected to be 1 ms which is the duration of the subframe, also referred to as data signal block. A receiver, like a mobile user, processes the data with a granularity of 1 ms, i.e. each millisecond the receiver synchronizes with the radio network and processes the control information. In case processing the control information shows that data is designated for the receiver, the data channel is decoded. There may be situations, for example extreme real-time communication use cases, like ultra-low delay (ULD) services, where an end-to-end latency needs to be reduced to 1 ms or less. When the receiver processes the data with a granularity of 1 ms, a reduction of the end-to-end latency is not achievable. A latency reduction to 1 ms or less may bring significant benefits in terms of throughput increase, for example in file transfer protocol (FTP)/transmission control protocol (TCP) transmissions in slow start mode and may also lead to a faster processing at the application layer. In the example of FIG. 2 the sub-frame has a sTTI length of two OFDM symbols.

In FIG. 2 the area defined by a plurality of the resource elements 106 of the OFDM symbols 0 and 1 is referred to as a control region 114 of the data signal block, and the remaining symbols 2 to 13 are referred to as a payload region 116. The control region 114 is used to transmit control data to the UE, for example in the PDCCH, the PCFICH and the PHICH. A number of resource elements in the control region is allocated to the PCFICH, and a number of resource elements is allocated to the PHICH. Further resource elements of the control region are allocated to the PDCCH. The PDCCH may carry control data for the uplink/downlink communication between the user equipment (UE) and the base station and for operating the UE. The control region may also transmit reference signals 110. Some resource elements may not be used, for example, resource elements 112. The control region 114 is also referred to as the control channel of the subframe.

Figure 3:
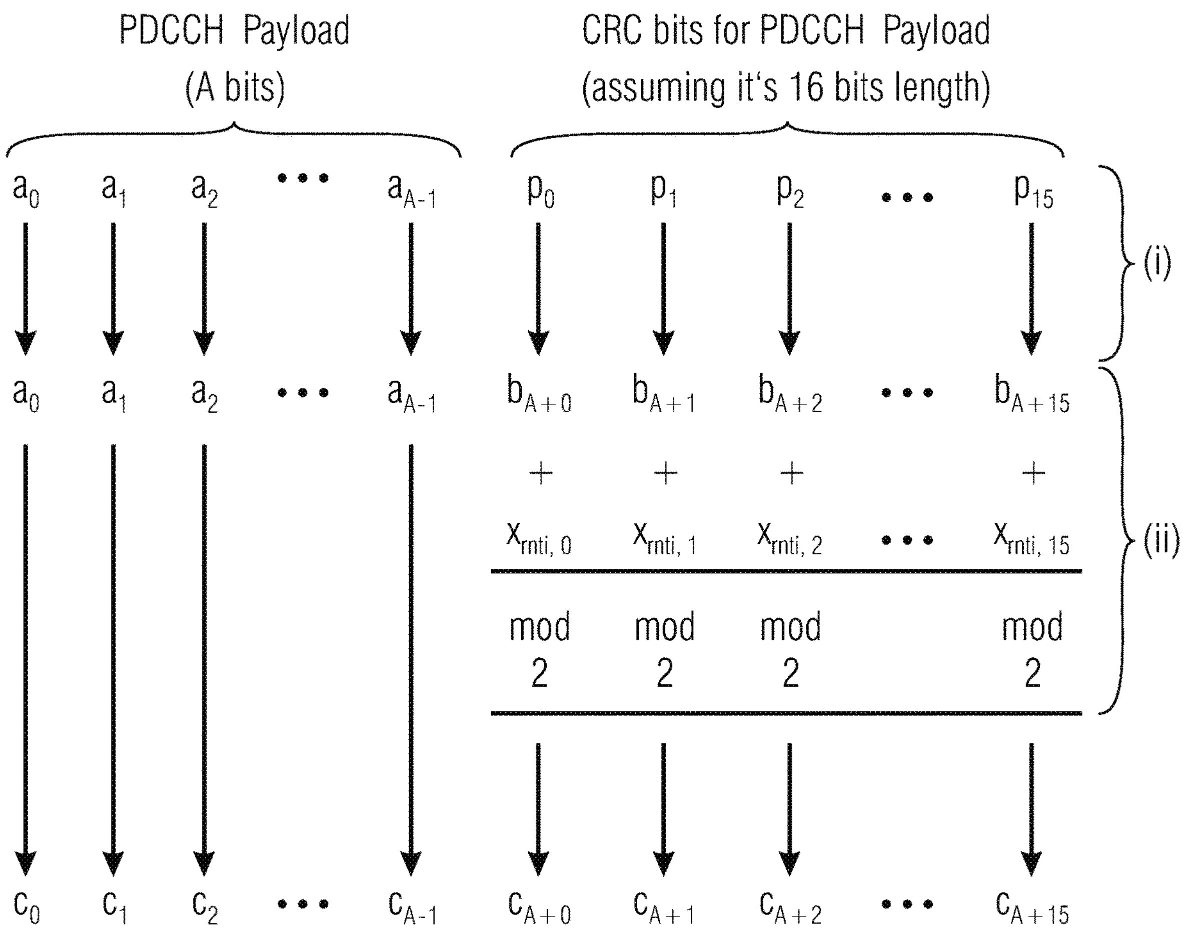
FIG. 3 shows an example for the PDCCH CRC design.

The control data included in the PDCCH is also referred to as PDCCH payload. The integrity of the PDCCH payload is ensured by a cyclic redundancy check (CRC). FIG. 3 shows an example for the PDCCH CRC design. As is indicated at (i), the PDCCH payload includes A bits, namely bits $a_0$ to $a_{A-1}$. For the PDCCH payload CRC parity bits $p_0$ to $p_{15}$ are calculated. The CRC parity bits are scrambled at the base station with the radio network temporary identifier (RNTI) of a mobile user or a group of mobile users to which the message or control data included in the PDCCH is directed to. The scrambling is schematically represented in FIG. 3 at (ii). At the UE side the PDCCH may be blind decoded in that the received CRC bits are scrambled again with the RNTI for the UE that received the PDCCH and are checked against the PDCCH payload. When the UE has an RNTI matching the one used for scrambling with the CRC, the process will be successful and the message will be further processed by the UE. Otherwise, in case the RNTI of the UE does not match the RNTI used for scrambling with the CRC bits at the base station, the process will fail and the message will be ignored. Thus, a UE will only consider data included in the PDCCH payload that is directed towards this UE.

Depending on the cell configuration in the wireless communication network the control region 114 may include the $1^{st}$, $2^{nd}$ and $3^{rd}$ symbols of the subframe. During this time, in accordance with conventional approaches, no user payload data, also referred to as downlink (DL) data, is sent. In accordance with other embodiments, the control region may include more than three symbols, e.g., four symbols are possible for system bandwidths below 10 physical resource blocks (1.4 MHz).

The PDCCH is divided into channel control elements (CCE). Each CCE has nine resource element groups (REG) and each REG includes four consecutive resource elements (RE). The number of CCEs of the PDCCH is referred to as the CCE aggregation level that may be 1, 2, 4 or 8. The following table summarizes examples of possible PDCCH formats, in terms of aggregation levels, and indicates the corresponding number of resource element groups and PDCCH bits.

PDCCH formats.

| PDCCH format | Number of CCEs (n) | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

FIG. 4 shows tables indicating the number of resource elements available for the PDCCH dependent on the bandwidth of the system and the desired dimension of the PDCCH being either one, two or three OFDM symbols. FIG. 4(*a*) shows a table the PDCCH dimensioning in a system having a bandwidth of 10 MHz. The first line of the table indicates the control format indicator (CFI) indicating how many OFDM symbols are to be used for carrying the control region in each subframe. Setting CFI to 1 means that one symbol, the first symbol, in the subframe is used for the PDCCH allocation, setting CFI to 2 or 3 means that two symbols, the first and second symbols, or three symbols, the first, second and third symbols, are used for the PDCCH allocation. The second line of the table indicates the resource blocks or physical resource blocks (PRB) of the control region which, in the depicted example, is 50 yielding a total number of resource elements available to be 600 for a CFI of 1, 1200 for a CFI of 2 and 1800 for a CFI of 3. Besides the control information in the PDCCH, the control region also includes the reference signals RS as well as the PCFICH and the PHICH. The RS, the PCFICH and the PHICH are transmitted in the first symbol of the control region, and the $4^{th}$, $5^{th}$ and $6^{th}$ line of the table in FIG. 4(*a*) indicate the number of resource elements allocated to the reference signals, the PCFICH and the PHICH. In the example of FIG. 4, in the 10 MHz bandwidth system, the number of resource elements allocated to the reference signals, to the PCFICH and to the PHICH is 300, leaving for a CFI of 1 further 300 resource elements that may be used for the PDCCH. When using a system with a CFI of 2 or 3, the number of resource elements available for the PDCCH increases to 900 or 1500. This is indicated in the line labelled "PDCCH REs" in the table. Furthermore, the corresponding number of CCEs available for the PDCCH are indicated to be 8, for a CFI of 1 and increasing to 25 and 41 for a CFI of 2 and a CFI of 3, respectively.

FIG. 4(*b*) and FIG. 4(*c*) show tables including the same information as in the table of FIG. 4(*a*) but for systems having a bandwidth of 5 MHz and 20 MHz, respectively. In such systems, after allocating the resource elements for the reference signals, the PCFICH and the PHICH, the number of available resource elements for the PDCCH increases with the number of symbols defining the control region.

For example, when considering the 10 MHz bandwidth system as indicated in the table of FIG. 4(*a*) and having a CFI of 1, 8 CCEs are available for defining the PDCCH. 8 CCEs correspond to 72 REGs or 288 REs that are available for sending control information to a user. Depending on the modulation, a resource element may carry more or less information. For example, when using a quadrature to a phase shift keying (QPSK) modulation each resource element carries two bits. Using such the QPSK modulation allows for a PDCCH including 228×2 bits=576 bits, and, when keeping the standard 16 bit CRC for the parity check and for the blind decoding, 560 bits remain available for transmitting information in the PDCCH. In other examples, a quadrature amplitude modulation (QAM), like a 16-QAM or a 64-QAM, may be used, so that one resource element carries 4 bits or 6 bits, respectively, thereby increasing the amount of data that may be included into the PDCCH.

In accordance with the inventive approach, rather than limiting the control region to the transmission of control information only, payload data for the user may also be sent during the time the control information is transmitted to the UE, i.e., payload data is also mapped into the control region of the subframe. As indicated above, there are scenarios in with which the latency to provide user data to a UE needs to be reduced. For example, delay critical data needs to be transmitted to the user with a low latency and, advantageously, also with a substantially constant bit rate. However, when there is no transmission of user data in the control region, there is a delay in the transmission of the user data, and the data rate provided to the user over the subframe varies, which is also referred to as downlink throughput jitter. The inventive approach allowing to allocate user payload data to the control region reduces the delay for the transmission of delay critical data to the UE and/or reduces the downlink throughput jitter as bursts of payload data are now transmitted during the entire subframe, i.e., also within the control region.

In accordance with the inventive approach, the resources in the control region, e.g. the resource elements, may be used for transmitting payload data to the user, for example by allocating such payload data to resource elements in the control region that are not used by the reference signals (RS) or the control information (PCFICH, PHICH, PDCCH). In other examples, the user payload data may be part of the PDCCH and resources for transmitting the user payload data may be made available by extending the PDCCH length from one symbol to two or three symbols.

In accordance with embodiments of the present invention, the additional payload data may be allocated to resource elements in the control region not used for transmitting control information, for example in areas or parts of the control region in which resource elements have been freed. In accordance with other embodiments, the payload data for the UE may be included into the PDCCH. The control data is also referred to as downlink control information (DCI). FIG. 5 shows a DCI message format in accordance with an embodiment of the present invention allowing to send payload data within the control region. The DCI message 117 includes a control information section 118 for the UE, e.g., HARQ process information. In the depicted embodiment, section 118 may include information referring to the "HARQ process", the "new data indicator" and the "redundancy version". The control information section 118 in FIG. 5 represents an example of control information that may be transmitted to a UE in accordance with the LTE standard. It is noted that the inventive approach is not limited to the control information indicated in control information section 118 of FIG. 5, rather, dependent on the standard for the wireless transmission, different control information may be provided to the UE.

In accordance with the inventive approach, the DCI message 117 of FIG. 5 includes, in addition to the control information section 118, a data section 120 that is used to send to the UE user payload data, e.g., delay critical data. The user to receive the payload data is indicated implicitly within the message using the 16 bit radio network temporary identifier (RNTI) of the UE (C-RNTI) so that this information is not send again. Backward compatibility is achieved due to the blind decoding of the user specific RNTI scrambled DCI message so that also a legacy UE, that is not configured to implement the inventive approach, will disregard the message, due to the failed CRC check.

The DCI message 117 includes the additional 65 to 570 bits which are used to define user payload data. For example, when considering a system having a 10 MHz bandwidth (see the table in FIG. 4(*a*)) with a CFI of 1, 300 resource elements are available for the PDCCH to carry information representing the DCI. When using 8 CCEs 288 resource elements are used for the PDCCH, and assuming a QPSK modulation of each RE (each RE carries two bits), the available bits for the DCI message would be 576. When maintaining the 16 bit CRC for the parity check, this yields 560 bits available for the transmission of additional payload data. Naturally, as is indicated in the comments in FIG. 5, dependent on the CCE aggregation level, the number of bits available for the transmission of additional payload data may vary.

FIG. 6 shows a DCI message 117' in accordance with a further embodiment of the present invention. The DCI message 117' of includes the control information section 118 and the data section 120 described above with reference to FIG. 5. When compared to FIG. 5, the DCI message 117' of FIG. 6 includes, in addition, the further control information section 122 including additional control information for the uplink from the UE to the base station. In the embodiment depicted in FIG. 6 reference is made to the 3GPP TS 36.213 specification (Evolved Universal Terrestrial Radio Access (E-UTRA); Physical layer procedures). Including this information into the DCI message 117' may be advantageous as it reduces the latency for the uplink.

In the embodiments described with reference to FIGS. 5 and 6, the user payload data to be transmitted in the control region is included into the DCI message 117 or 117', and resource elements allocated to the PDCCH including the DCI message may be QPSK modulated. The embodiments described with reference to FIGS. 5 and 6 are advantageous due to the robust modulation of the information on the resource elements using the QPSK modulation, however, the robust modulation may go together with a reduced spectral efficiency and a reduced coding rate. In the following, further embodiments are described applying an adaptive coding and modulation for the user payload data to be transmitted in the control region of the subframe.

FIG. 7 shows an embodiment of the present invention using a DCI message 123 as it may be transmitted towards a UE in the PDCCH. The DCI message includes similar control information in the control information section 118 as explained with reference to the examples of FIGS. 5 and 6. As mentioned above, also other control information may be transmitted. The DCI message 123 includes information about the payload data, however, rather than including the payload data to be provided to the user in the DCI message 123 itself, the DCI message 123 includes the resource allocation section 124 indicting to the UE which CCEs, RPRBs or REs within the control region or within the part of the control region allocated to the PDCCH includes the user payload. In addition to the information about the part of the control region where the additional user payload data may be found, the DCI message 123 includes the section 125 which holds include information how the payload data has been modulated and encoded for the data transmission to allow the UE to correctly process the user payload data found at the indicated portions of the control region. In other words, section 125 may hold physical layer information so as to decode the resources specified in section 124. In the embodiment depicted in FIG. 7 reference is made to the 3GPP TS 36.212 specification (Evolved Universal Terrestrial Radio Access (E-UTRA); Multiplexing and channel coding).

Thus, in accordance with the embodiment of FIG. 7, the actual payload data is not part of the DCI message but is located at different parts of the control region or a region associated with the PDCCH. This allows for a more efficient transmission of the user payload data as due to its separation from the DCI message, which is provided in accordance with the requirements of the standard, for example by using the QPSK modulation and the like, the additional information in the other resource elements of the other parts of the control region may be processed differently, e.g., another modulation scheme or another coding scheme may be applied, for example a 16-QAM or a 64-QAM. Also advanced transmission modes may be applied, like MIMO or beamforming. This allows to achieve a higher spectral efficiency for transmitting the user payload data.

Figure 8B:
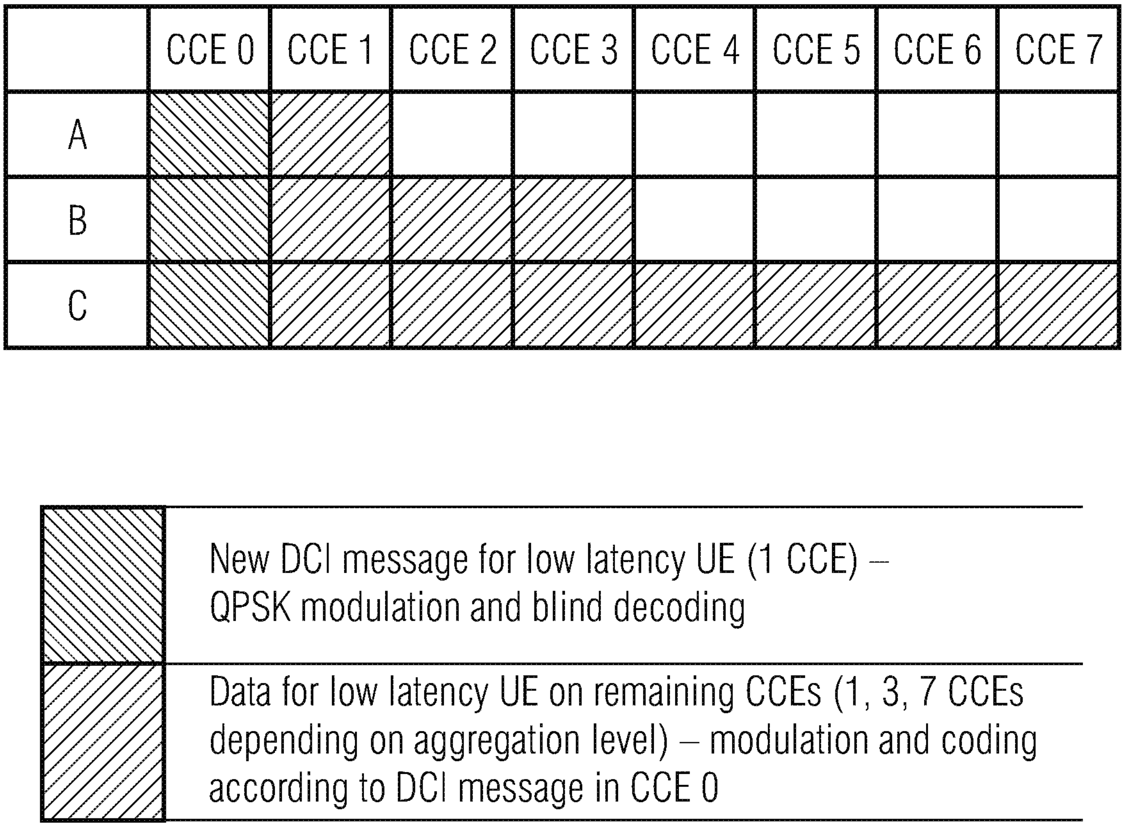

FIG. 8 shows an embodiment for the allocation of CCEs within the PDCCH or within the control region, but outside of the DCI message for providing the user payload data in the control region. FIG. 8(*a*) shows a DCI message 123' which includes the field 124' having a length of 2 bits and indicating the CCE aggregation level to be 2, 4 or 8. This indicates that the PDCCH, which includes the DCI message and the additional user payload data, is formed of 2, 4 or 8 consecutive CCEs. As may be seen from FIG. 8(*b*), an aggregation level of 2 indicated in section 124' of the DCI message 123' means that the PDCCH in the control region of the data signal block is formed by two consecutive CCEs, as shown in the table in FIG. 8(*b*) in the line A. The CCE 0 includes the DCI message and may be provided in a format in accordance with a given standard, like the LTE standard. CCE 0 may be QPSK modulated and may include the information for allowing blind decoding of the message. The CCE 1 that immediately follows CCE 0 includes the data for the low latency UE. In case a different modulation/coding is used for CCE 1, when compared to the CCE 0, this may be signaled in the field 125' of the DCI message 123' as well. In general, besides defining the number of CCEs immediately following the CCE including the DCI message 123', the field 125' may include additional information informing the UE how the data at the additional CCEs is to be processed, for example by including into field 125' information about the transmission scheme, the coding scheme and the modulation scheme used for forwarding the payload data to the UE.

With regard to the DCI message 123' of FIG. 8(*a*), it is noted that additional information may be provided in control information section 125', as also explained with reference to field 125 in FIG. 7. Information different from the one shown in the control information section 118 may also be transmitted to the UE, dependent on the communication between the base station and the user and dependent on the standard applied. It is noted that the additional control information 125' may be omitted so that only control information in the control information section 118 and the additional information (resource allocation) 124' is transmitted to the UE, e.g., in case all CCEs, the CCE including the DCI message 123' and the following CCEs, use the same modulation/coding.

In accordance with the embodiment of FIG. 8(*a*), the DCI message 123' may signal in the section 124' the resource allocation in terms of the CCE aggregation level indicating the overall number of CCEs used for the PDCCH so that, assuming that the first CCE is for the DCI message, the number of additional CCEs used for the payload data are known, i.e. the number of CCEs following the first CCE including the DCI message is known.

FIG. 8(*c*) describes a further embodiment not relying on the signaling of the CCE aggregation level. The DCI message 123" of FIG. 8(*c*) includes the resource allocation section 124" in which, rather than indicating the CCE aggregation level, the actual resource allocation length, namely the length of the PDCCH, e.g., CCEs, is signaled. It may be signaled that the PDCCH includes 2 CCEs, 3 CCEs or 7 CCEs so that the number of CCEs including payload data and immediately following the first CCE including the DCI message 123" may be derived from section 124".

Figure 9:
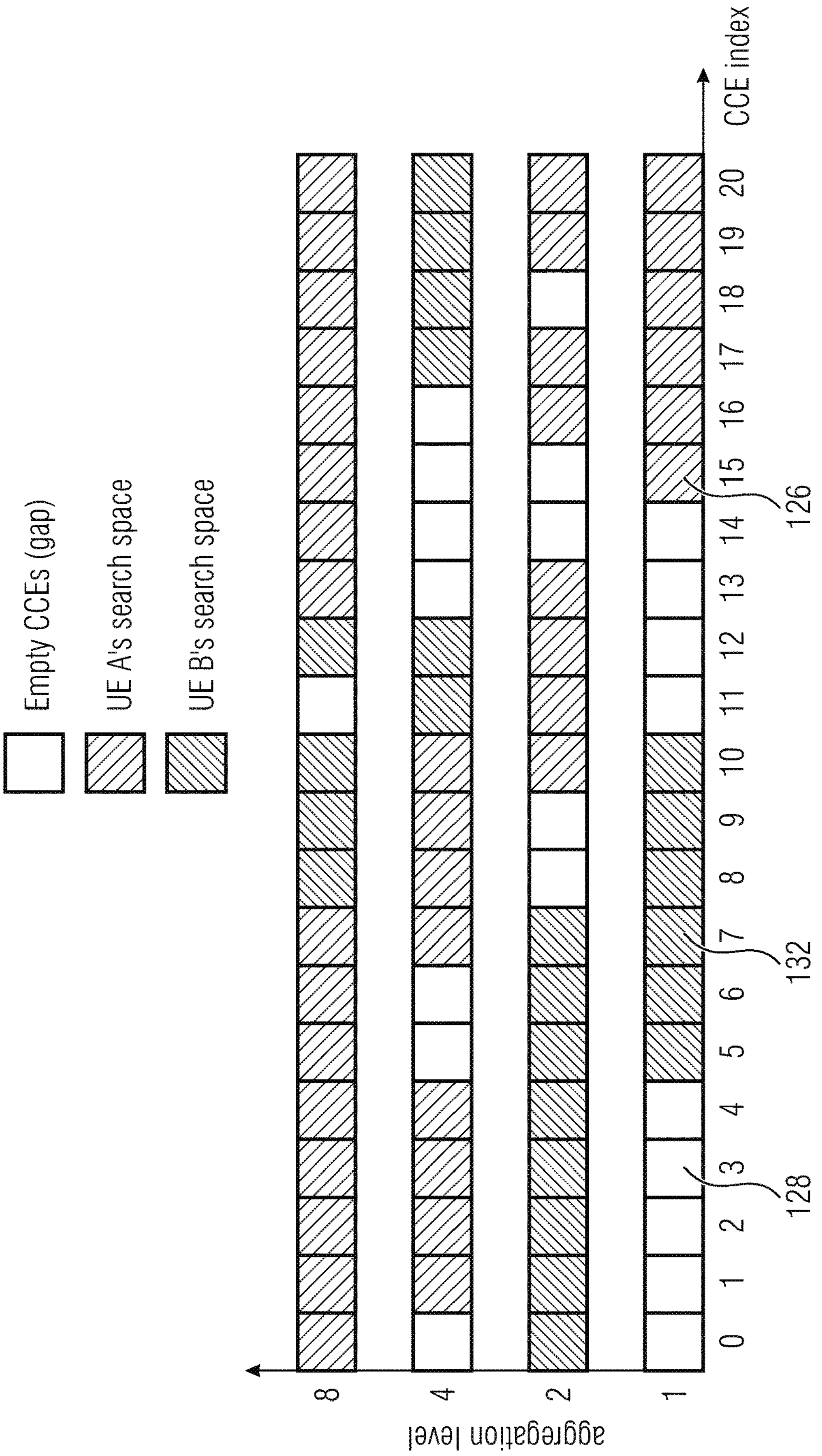
FIG. 9 illustrates a search space distribution for two UEs during PDCCH scheduling.

In the following, another embodiment of the inventive approach will be described in accordance with which unused CCEs within the control region of the data signal block are used as data channel, for example as a PDSCH, to transmit user payload data within the control region. FIG. 9 illustrates a search space distribution for two UEs during PDCCH scheduling. The respective CCE index is indicated along the horizontal axis with respect to the CCE aggregation level indicated along the vertical axis. For each CCE aggregation level, the CCEs 126 for a UE A are indicated. As may be seen from FIG. 9, dependent on the CCE aggregation level, the number of empty CCEs 128, i.e. CCEs not assigned to the UE A, varies. The non-assigned CCEs 128 are shown by the empty boxes in FIG. 9. In accordance with a further embodiment, the unused CCEs 128 may be used as data channel, for example as an PDSCH. A DCI message, in accordance with such an embodiment, indicates in section 124 (see FIG. 7) the PDSCH location in the control region (resource allocation), and in section 125 (see FIG. 7) information about the coding, modulation and/or additional information for processing the user payload data provided at the indicated location.

Figure 10A:
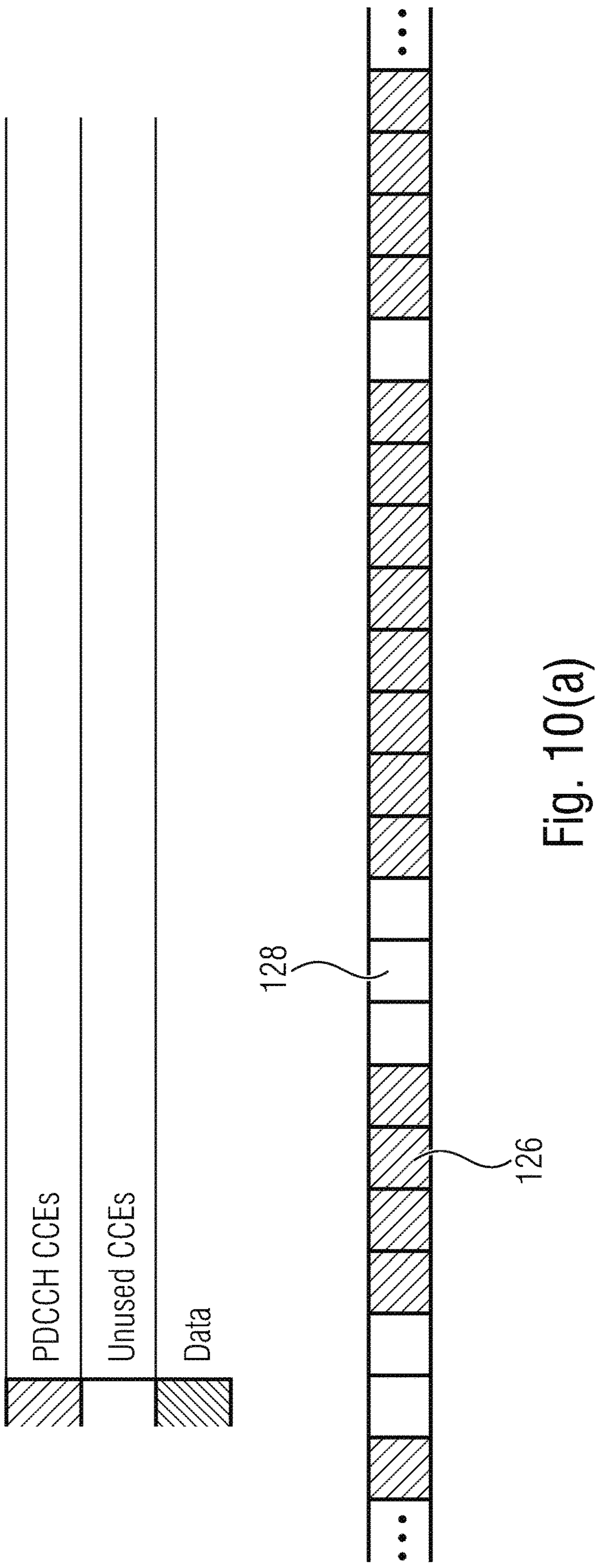
FIG. 10*a-b* shows an embodiment for inserting user payload data at unused CCEs, FIG. 10(*a*) showing a plurality of CCEs including CCEs associated with the PDCCH of a UE and unused CCEs, and FIG. 10(*b*) showing DCI message, indicating the originally unused CCEs to which now payload data for the user is allocated.
Figure 10B:
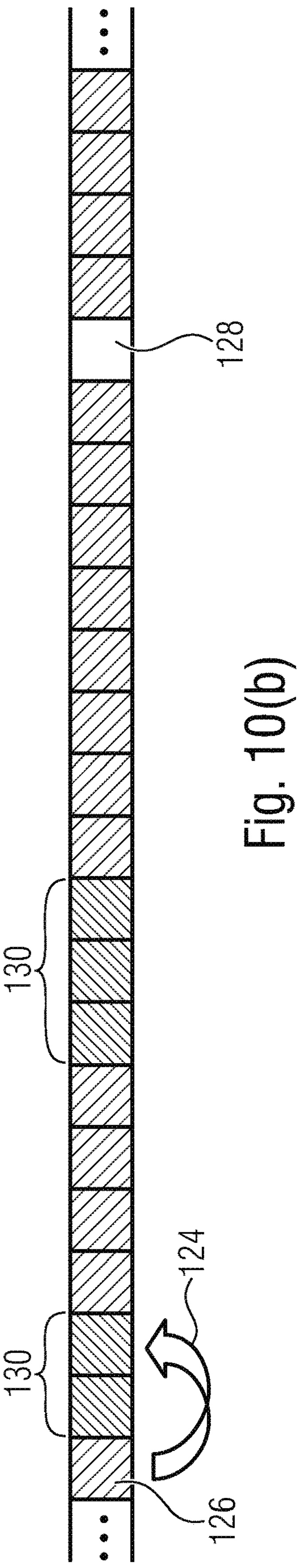

FIG. 10 shows an embodiment inserting user payload data at unused CCEs 128. FIG. 10(*a*) shows a plurality of CCEs including CCEs 126 associated with the PDCCH of a UE as well as unused or empty CCEs 128. In accordance with the present embodiment, as is shown in FIG. 10(*b*), the first CCE 126 shown in FIG. 10(*b*) may include the DCI message, for example a message as shown in FIG. 7 indicating at 124 the originally unused CCEs to which now payload data for the user is allocated. In FIG. 10(*b*) CCEs including payload data are CCEs 130. The DCI message may also indicate in section 124 the position, modulation, and other parameters for handling the data. In accordance with another embodiment, only the location of the additional CCEs including the payload data may be signaled and it is assumed to have the same properties as a PDSCH used for transmitting data in the payload region 118 (see FIG. 2) of the subframe.

In accordance with further embodiments, the unused CCEs may also be CCEs that are within the PDCCH search space of a plurality of UE, as is also shown in FIG. 9 showing in addition to UE A also the UE B and the associated search space including CCEs 132 of the UE B. The unused CCEs among the search spaces may be filled by additional data by one or both of the UEs A and B.

In accordance with another embodiment, a bitmap may be used to allocate empty CCEs for the downlink user data in the control region so as to allow for a flexible allocation of the resources/resource elements. In a system having a bandwidth of 20 MHz and a CFI of 3 (see FIG. 4(*c*)) this may use up to 84 bits. Similar to the DL resource allocation of type 0 and type 1 in accordance with the LTE standard, the bitmap size may be reduced. As a base unit, the CCEs are used. When considering a system having 10 MHz bandwidth and a CFI of 3, a resource allocation type 0 and a resource block group (RBG) size of 3 leads to a bitmap length of cell (50/3)=17, so that the RBG group 1 allocates CCEs 0-16, RBG group 2 allocates CCEs 17-33, and RBG group 3 allocates CCEs 34-59. In accordance with an embodiment, as depicted in FIG. 11, the DCI message 133 may include a section 124''' indicating the RBG and the resource allocation. The DCI message 133 of FIG. 11, otherwise, is similar to the one in FIG. 8(*a*) or in FIG. 8(*c*), except for the information provided in addition for the allocation of the CCEs, including the additional payload data.

Figure 12:
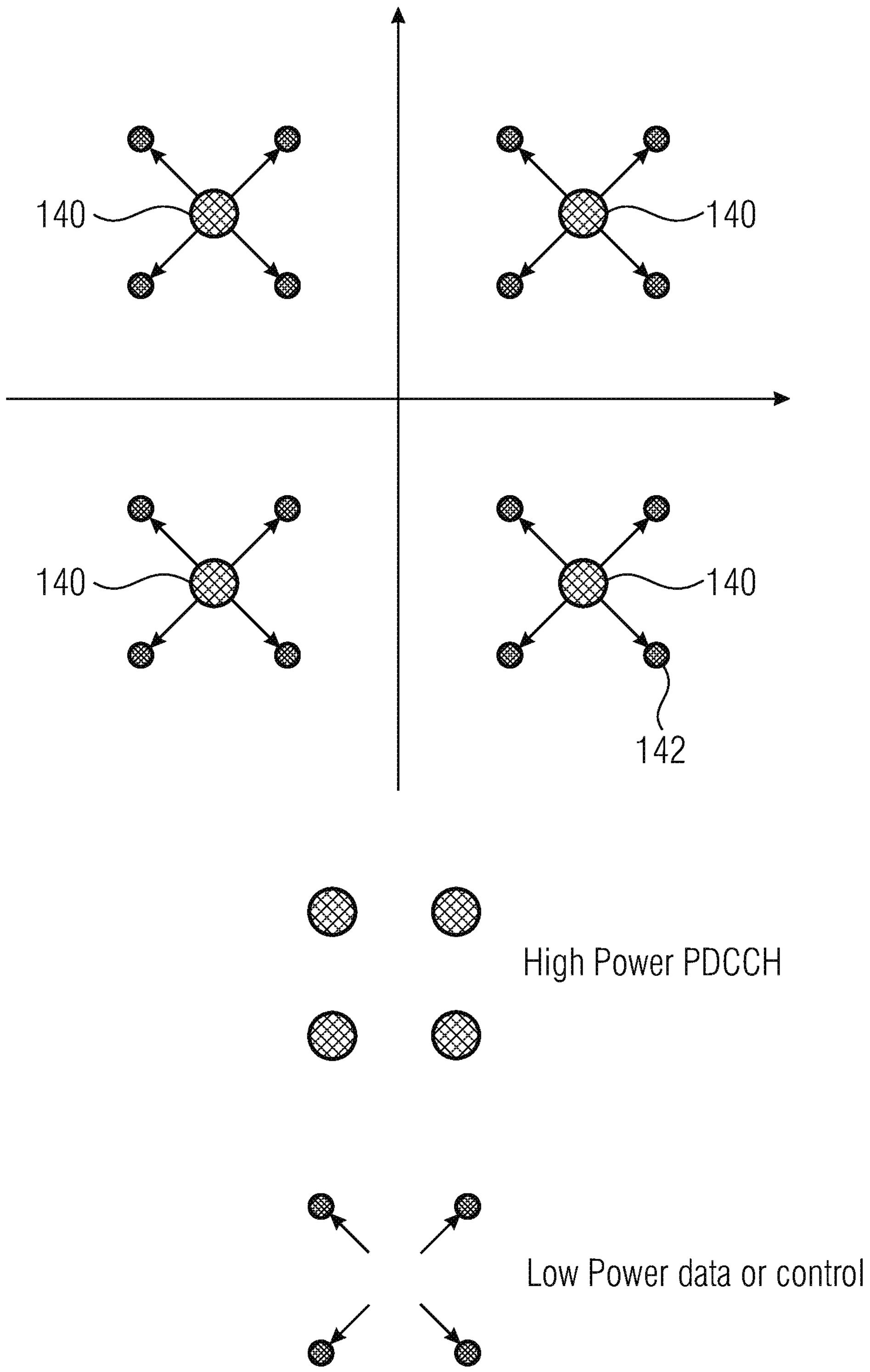
FIG. 12 shows an embodiment for providing a low power PDSCH and/or additional PDCCH control information on top of legacy PDCCH control information.

In the embodiments described so far, the user payload data to be transmitted to the low latency UE in the control region of the data signal block is allocated to resource elements, physical resource blocks or CCEs provided in addition to respective resources used for allocating the DCI message or is transmitted as a part of the DCI message. In accordance with other examples, the payload data may be provided on top of the control channel elements using superposition, for example in the LTE standard by applying a downlink multi-user superposition transmission (MUST), for example on the basis of a hierarchical modulation. Alternative superposition techniques such as resource spread multiple access (RSMA) as described, e.g., in 3GPP TDOC R1-163510, sparse code multiple access (SCMA) as described, e.g. in 3GPP TDOC R1-162153, or non-orthogonal multiple access (NOMA) as described, e.g., in 3GPP TDOC R1-163111, may be used. One or more resource elements, physical resource blocks or CCEs allocated to control information, like PDCCH, PCFICH, PHICH may have provided on top thereon the user payload data to be transmitted to the UE within the control region. FIG. 12 shows an embodiment for providing a low power PDSCH and/or additional PDCCH control information on top of legacy PDCCH control information, i.e. to provide additional user payload data within the control region or additional control information on top of the control information that is transmitted in the control region in accordance with a standard, for example the LTE standard. In FIG. 12, elements 140 represent high power PDCCH information transmitted in accordance with the standard using QPSK modulation, and elements 142 indicated low power data and/or control information provided on top of the PDCCH data using superposition. The PDCCH is transmitted with high power, and the additional data and/or control information is sent on top.

The additional information on top of the control information may be seen by a UE as additional noise when it comes to decoding the information provided to the UE. In accordance with embodiments, it may be that UE at the cell edge, due to the additional information on top of the control information seen as noise, may not be in a position to decode the legacy PDCCH information so that it may be desired to allow the superposition of additional low latency data only for users which are at the center of the cell as this ensures that the PDCCH may be successfully decoded. The additional data may be superposed onto the PDCCH information using QAM, for example a QPSK in 16-QAM as shown in FIG. 12.

In accordance with embodiments, the superposition of additional information may be signaled to the user using the DCI message, for example a DCI message as shown in FIG. 7 including in section 124 the information about the additional data provided on top of the control information. In accordance with other embodiments, the superposition of data may be provided in combination with the above-referenced embodiments in which additional resources are allocated for the user payload data in the control region. In accordance with embodiments, onto the payload data for which the resources are allocated in the control region, additional payload data may also be superposed. In such embodiments, the information that there is a superposition may either be part of the information about the allocation of additional user payload information, or it may be signaled within the DCI message, for example in the LTE standard in the information concerning the modulation encoding scheme used for transmitting the block, the MCS section which then, in addition, includes the information for the "MUST".

FIG. 13 shows an embodiment using a DCI message 143 which is similar to the one of FIG. 11, except for the modified MCS section 125" including information about the modulation and coding scheme used for the MUST.

In accordance with further embodiments, the approach described above with reference to FIGS. 12 and 13 regarding the superposition of payload data onto control information may also be used to transmit additional control information, thereby reducing the aggregation level needed for transmitting the desired control information to the UE. For example, a DCI message including a part of the control information as well as a valid legacy CRC may be used, and any additional information may be provided with MUST on top of the first information and may be decoded in a second step. Thus, when compared to the example of FIGS. 12 and 13, instead of providing additional payload data on top of the control information, the additional data provided on top of the control information is either additional control information or part of the control information that, conventionally, is transmitted using additional CCEs. In accordance with embodiments, no specific signaling of superimposed control information is needed provided the UE or receiver is aware of such superposition, for example is a MUST capable receiver. In this case the receiver will look for information on top of the control information, in case incomplete messages are received. In other embodiments, the control information may include a flag indicating to a receiver that there is additional information on top of the control information.

Figure 14:
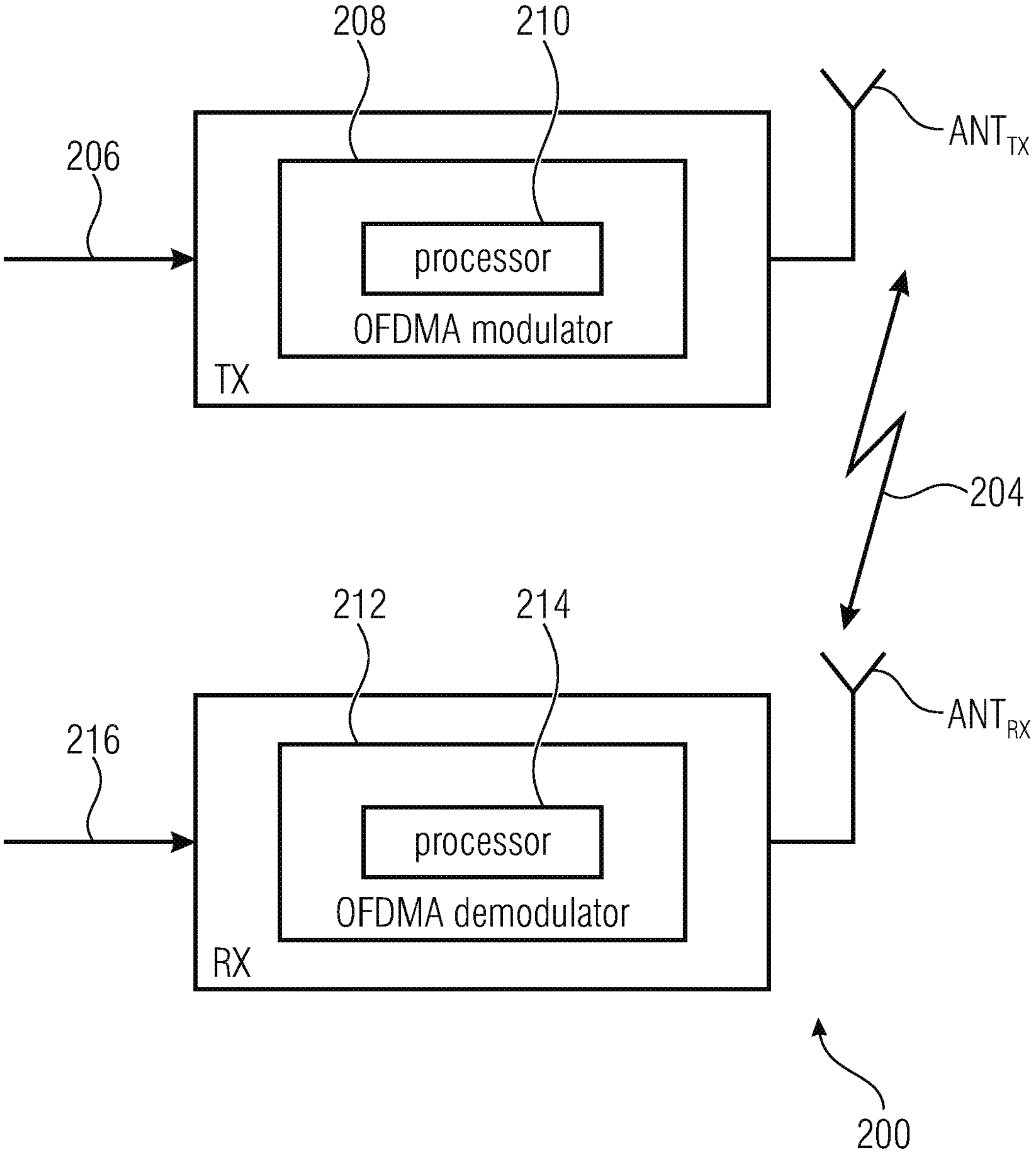
FIG. 14 is a schematic representation of a wireless communication system for transmitting information from a transmitter to a receiver.

Embodiments of the present invention may be implemented in a wireless communication system as depicted in FIG. 1 including a transmitter, like a base station, and a receiver, like a mobile terminal. FIG. 14 is a schematic representation of a wireless communication system 200 for transmitting information from a transmitter TX to a receiver RX. The transmitter TX includes at least one antenna $ANT_{TX}$ and the receiver RX includes at least one antenna $ANT_{RX}$. In other embodiments, the transmitter TX and/or the receiver RX may include more than one antenna to implement a MIMO, SIMO or MISO. As is indicated by the arrow 204 signals are transmitted from the transmitter TX to the receiver RX via a wireless communication link, like a radio link. The transmission may be in accordance with the OFDMA communication approach, and the above referenced transmission time interval indicates the time period of a radio transmission from the transmitter TX to the receiver RX. The transmitter TX comprises an input 206 for receiving data to be transmitted to the receiver RX. The input data 206 is received at an OFDMA modulator 208 comprising a signal processor 210 for processing the received signals 206 to generate a data signal to be transmitted to the receiver RX.

The signaling between the transmitter TX and RX is in accordance with the above described embodiments of the present invention, e.g., the transmitter may include the OFDMA modulator operating so as allocate payload data in the control region, like in a PDCCH, of the subframe for an increased payload data throughput. The receiver RX receives via the antenna the signal from the transmitter TX and applies the signal to the OFDMA demodulator 212 including a signal processor 214 for processing the received signal to generate an output signal 216.

Figure 15:
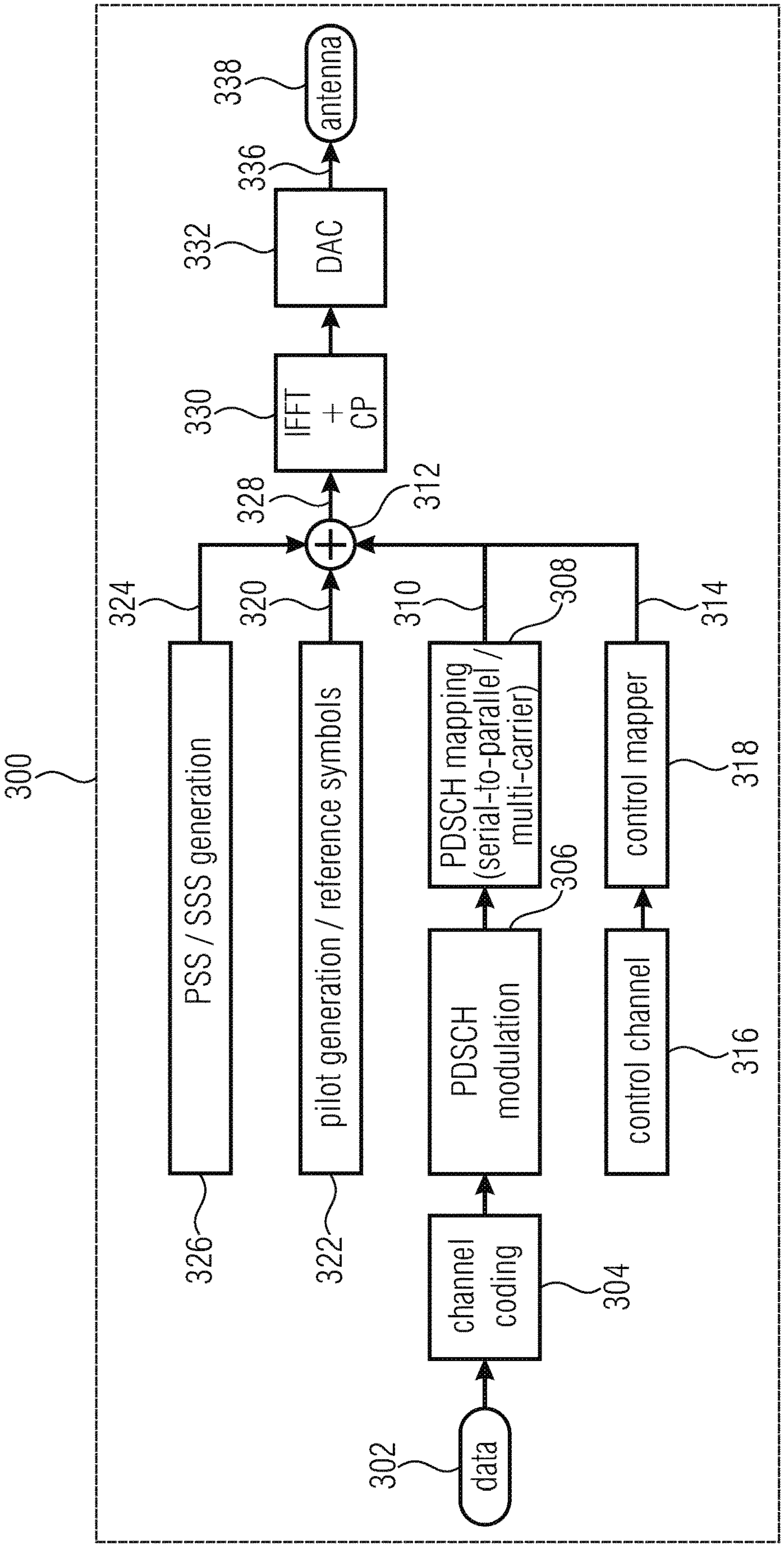
FIG. 15 is a schematic representation of transmitters in a wireless communication system for transmitting data or information to a receiver in accordance with embodiments

FIG. 15 is a block diagram of a first transmitter 300 in a wireless communication system for transmitting information to a receiver in accordance with embodiments described above. The transmitter 300 receives data 302 that is encoded by the channel encoder 304, modulated by the modulator 306 and mapped to the multiple carriers by the mapper 308. The signal 310 is combined at 312 with control signals 314 provided by the control channel unit 316 and the control mapper 318, with pilot symbols 320 from the pilot symbol generator 322, and with PSS/SSS signals 324 from the PSS/SSS signal generator 326. The combined signal 328 is provided to the $IFFT_{+}CP$ block 330, is converted by the DAC 332 into the analog domain. The analog signal 336 is processed for radio transmission and eventually transmitted by the antenna 338. In accordance with embodiments, the inventive aspects may be implemented using the mapper 318 for mapping the control data and payload data to the control region in accordance with the embodiments described above.

The above described inventive approach may be implemented in various embodiments. For example, payload data may be transmitted in a wireless communication system with a reduced latency by placing payload data in the control region. In accordance with embodiments a nearly constant low latency downlink throughput may be achieved by placing payload data, for example, in a physical downlink control channel (PDCCH) of an OFDMA-subframe. In accordance with other embodiments a single packet may be transmitted to a user during one slot (see FIG. 2) due to the improved user payload capacity. In accordance with yet other embodiments the inventive approach may be used to send short information to a receiver, e.g. to provide control information allowing to remotely control an actuator. For example, to control a movement of an actuator, like a camera arm, the instruction for a movement in a specific direction or for stopping the movement may be transmitted in the control region thereby improving the responsiveness of the actuator to an issued command.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Depending on certain implementation requirements, embodiments of the invention may be implemented in hardware or in software. The implementation may be performed using a digital storage medium, for example a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

Further embodiments are now described:

A $1^{st}$ embodiment provides a receiver ($UE_1$, $UE_2$, RX), wherein the receiver ($UE_1$, $UE_2$, RX) is configured to receive and process a data signal, the data signal comprising at least one data signal block, the data signal block having a number of symbols in the time domain and a number of sub-carriers in the frequency domain, wherein the data signal block comprises a control region (114) to provide control data (117, 117', 123, 123', 123", 133, 143) to the receiver ($UE_1$, $UE_2$, RX) and a payload region (118) to provide payload data to the receiver ($UE_1$, $UE_2$, RX), and wherein payload data is allocated to the control region (114) of the data signal block.

A $2^{nd}$ embodiment provides the receiver ($UE_1$, $UE_2$, RX) of the $1^{st}$ embodiment, wherein resource elements of the data signal block are respectively defined by a symbol and a sub-carrier, and the payload data is allocated to one or more parts of the control region (114) of the data signal block, a part of the control region (114) including one or more resource elements.

A $3^{rd}$ embodiment provides the receiver ($UE_1$, $UE_2$, RX) of the $1^{st}$ embodiment or the $2^{nd}$ embodiment, wherein the control region (114) is defined by one or more consecutive symbols at the beginning of the data signal block.

A 4$^{th}$ embodiment provides the receiver (UE$_1$, UE$_2$, RX) of one of the preceding embodiments, wherein the payload data allocated to the control region (114) of the data signal block comprises delay critical user data.

A 5$^{th}$ embodiment provides the receiver (UE$_1$, UE$_2$, RX) of one of the preceding embodiments, wherein the control region (114) of the data signal block includes information indicating a receiver (UE$_1$, UE$_2$, RX) to which the payload data is directed.

A 6$^{th}$ embodiment provides the receiver (UE$_1$, UE$_2$, RX) of the 5$^{th}$ embodiment, wherein the information indicating the receiver (UE$_1$, UE$_2$, RX) to which the payload data is separate from the control data (117, 117', 123, 123', 123", 133, 143) or is part of the control data (117, 117', 123, 123', 123", 133, 143).

A 7$^{th}$ embodiment provides the receiver (UE$_1$, UE$_2$, RX) of the 5$^{th}$ embodiment or the 6$^{th}$ embodiment, wherein the control data (117, 117', 123, 123', 123", 133, 143) includes data comprising control information for the receiver (UE$_1$, UE$_2$, RX).

An 8$^{th}$ embodiment provides the receiver (UE$_1$, UE$_2$, RX) of the 5$^{th}$ embodiment or the 6$^{th}$ embodiment, wherein the control data (117, 117', 123, 123', 123", 133, 143) indicates that the control data includes the payload data.

A 9$^{th}$ embodiment provides the receiver (UE$_1$, UE$_2$, RX) of the 8$^{th}$ embodiment, wherein the payload data is allocated to one of more consecutive parts of the control region (114) that immediately follow the part of the control region (114) to which the control data (117, 117', 123, 123', 123", 133, 143) is allocated.

A 10$^{th}$ embodiment provides the receiver (UE$_1$, UE$_2$, RX) of the 8$^{th}$ embodiment, wherein the payload data is allocated to one or more separate parts of the control region (114) that follow the part of the control region (114) to which the control data (117, 117', 123, 123', 123", 133, 143) is allocated.

An 11$^{th}$ embodiment provides the receiver (UE$_1$, UE$_2$, RX) of the 9$^{th}$ embodiment, wherein the payload data is allocated to one or more parts of the control region (114) that are located between parts of the control region (114) to which the control data (117, 117', 123, 123', 123", 133, 143) of different receivers (UE$_1$, UE$_2$, RX) are allocated.

A 12$^{th}$ embodiment provides the receiver (UE$_1$, UE$_2$, RX) of one of the 8$^{th}$ embodiment to the 11$^{th}$ embodiment, wherein the control data (117, 117', 123, 123', 123", 133, 143) indicates the one or more parts of the control region (114) to which the payload data is allocated, and comprises information for processing the payload data at the receiver (UE$_1$, UE$_2$, RX).

A 13$^{th}$ embodiment provides the receiver (UE$_1$, UE$_2$, RX) of the 5$^{th}$ embodiment or the 6$^{th}$ embodiment, wherein the control data (117, 117', 123, 123', 123", 133, 143) comprises control information for the receiver (UE$_1$, UE$_2$, RX), and at least a part of the control data (117, 117', 123, 123', 123", 133, 143) and the payload data are allocated to one or more common parts of the control region (114) of the data signal block by a superposition.

A 14$^{th}$ embodiment provides a receiver (UE$_1$, UE$_2$, RX), wherein the receiver (UE$_1$, UE$_2$, RX) is configured to receive and process a data signal, the data signal comprising at least one data signal block, the data signal block having a number of symbols in the time domain and a number of sub-carriers in the frequency domain, wherein the data signal block comprises a control region (114) to provide control data (117, 117', 123, 123', 123", 133, 143) to the receiver (UE$_1$, UE$_2$, RX) and a payload region (118) to provide payload data to the receiver (UE$_1$, UE$_2$, RX), wherein the control data (117, 117', 123, 123', 123", 133, 143) includes first control information and second control information, and wherein the first control information and the second control information are allocated to one or more common parts of the control region (114) of the data signal block by a superposition.

A 15$^{th}$ embodiment provides the receiver (UE$_1$, UE$_2$, RX) of one of the preceding embodiment, wherein the receiver (UE$_1$, UE$_2$, RX) is a mobile terminal in an OFDM or an OFDMA wireless communication system, and the data signal is an OFDM signal provided by a transmitter in the wireless communication system, the OFDM signal having a plurality of frames, the frame including a plurality of sub-frames, wherein the data signal block is a sub-frame of the OFDM signal, wherein the control region (114) comprises a plurality of resource elements of the first symbol of the sub-frame.

A 16$^{th}$ embodiment provides the receiver (UE$_1$, UE$_2$, RX) of the 15$^{th}$ embodiment, wherein the control region (114) further comprises a plurality of resource elements of one or more consecutive symbols of the sub-frame immediately following the first symbol of the sub-frame.

A 17$^{th}$ embodiment provides a data signal, comprising:

at least one data signal block, the data signal block having a number of symbols in the time domain and a number of sub-carriers in the frequency domain, wherein the data signal block comprises a control region (114) to provide control data (117, 117', 123, 123', 123", 133, 143) to a receiver (UE$_1$, UE$_2$, RX) and a payload region (118) to provide payload data to the receiver (UE$_1$, UE$_2$, RX), and wherein payload data is allocated to the control region (114) of the data signal block.

An 18$^{th}$ embodiment provides a data signal, comprising:

at least one data signal block, the data signal block having a number of symbols in the time domain and a number of sub-carriers in the frequency domain, wherein the data signal block comprises a control region (114) to provide control data (117, 117', 123, 123', 123", 133, 143) to a receiver (UE$_1$, UE$_2$, RX) and a payload region (118) to provide payload data to the receiver (UE$_1$, UE$_2$, RX), wherein the control data (117, 117', 123, 123', 123", 133, 143) includes first control information and second control information, and wherein the first control information and the second control information are allocated to one or more common parts of the control region (114) of the data signal block by a superposition.

A 19$^{th}$ embodiment provides a transmitter (TX, eNB$_1$-eNB$_5$, 300), wherein the transmitter (TX, eNB$_1$-eNB$_5$, 300) is configured to transmit a data signal, the data signal comprising at least one data signal block, the data signal block having a number of symbols in the time domain and a number of sub-carriers in the frequency domain, wherein the data signal block comprises a control region (114) to provide control data (117, 117', 123, 123', 123", 133, 143) to a receiver (UE$_1$, UE$_2$, RX) and a payload region (118) to provide payload data to the receiver (UE$_1$, UE$_2$, RX), and wherein payload data is allocated to the control region (114) of the data signal block.

A 20$^{th}$ embodiment provides a transmitter (TX, $eNB_1$-$eNB_5$, 300), wherein the transmitter (TX, $eNB_1$-$eNB_5$, 300) is configured to transmit a data signal, the data signal comprising at least one data signal block, the data signal block having a number of symbols in the time domain and a number of sub-carriers in the frequency domain, wherein the data signal block comprises a control region (114) to provide control data (117, 117', 123, 123', 123'', 133, 143) to a receiver ($UE_1$, $UE_2$, RX) and a payload region (118) to provide payload data to the receiver ($UE_1$, $UE_2$, RX), wherein the control data (117, 117', 123, 123', 123'', 133, 143) includes first control information and second control information, and wherein the first control information and the second control information are allocated to one or more common parts of the control region (114) of the data signal block by a superposition.

A 21$^{st}$ embodiment provides a wireless communication system, comprising:

a receiver ($UE_1$, $UE_2$, RX) as in one of the 1$^{st}$ embodiment to the 18$^{th}$ embodiment; and a transmitter (TX, $eNB_1$-$eNB_5$, 300) as in the 19$^{th}$ embodiment or the 20$^{th}$ embodiment.

A 22$^{nd}$ embodiment provides a method, comprising:

receiving and processing, by a receiver ($UE_1$, $UE_2$, RX), a data signal, the data signal comprising at least one data signal block, the data signal block having a number of symbols in the time domain and a number of sub-carriers in the frequency domain, wherein the data signal block comprises a control region (114) to provide control data (117, 117', 123, 123', 123'', 133, 143) to the receiver ($UE_1$, $UE_2$, RX) and a payload region (118) to provide payload data to the receiver ($UE_1$, $UE_2$, RX), and wherein payload data is allocated to the control region (114) of the data signal block.

A 23$^{rd}$ embodiment provides a method, comprising:

receiving and processing, by a receiver ($UE_1$, $UE_2$, RX), a data signal, the data signal comprising at least one data signal block, the data signal block having a number of symbols in the time domain and a number of sub-carriers in the frequency domain, wherein the data signal block comprises a control region (114) to provide control data (117, 117', 123, 123', 123'', 133, 143) to the receiver ($UE_1$, $UE_2$, RX) and a payload region (118) to provide payload data to the receiver ($UE_1$, $UE_2$, RX), wherein the control data (117, 117', 123, 123', 123'', 133, 143) includes first control information and second control information, and wherein the first control information and the second control information are allocated to one or more common parts of the control region (114) of the data signal block by a superposition.

A 24$^{th}$ embodiment provides a method, comprising:

transmitting, by a transmitter (TX, $eNB_1$-$eNB_5$, 300), a data signal, the data signal comprising at least one data signal block, the data signal block having a number of symbols in the time domain and a number of sub-carriers in the frequency domain, wherein the data signal block comprises a control region (114) to provide control data (117, 117', 123, 123', 123'', 133, 143) to a receiver ($UE_1$, $UE_2$, RX) and a payload region (118) to provide payload data to the receiver ($UE_1$, $UE_2$, RX), and wherein payload data is allocated to the control region (114) of the data signal block.

A 25$^{th}$ embodiment provides a method, comprising:

transmitting, by a transmitter (TX, $eNB_1$-$eNB_5$, 300), a data signal, the data signal comprising at least one data signal block, the data signal block having a number of symbols in the time domain and a number of sub-carriers in the frequency domain, wherein the data signal block comprises a control region (114) to provide control data (117, 117', 123, 123', 123'', 133, 143) to a receiver ($UE_1$, $UE_2$, RX) and a payload region (118) to provide payload data to the receiver ($UE_1$, $UE_2$, RX), wherein the control data (117, 117', 123, 123', 123'', 133, 143) includes first control information and second control information, and wherein the first control information and the second control information are allocated to one or more common parts of the control region (114) of the data signal block by a superposition.

A 26$^{th}$ embodiment provides a method, comprising:

transmitting, by a transmitter (TX, $eNB_1$-$eNB_5$, 300) of a wireless communication device, a data signal, the data signal comprising at least one data signal block, the data signal block having a number of symbols in the time domain and a number of sub-carriers in the frequency domain, wherein the data signal block comprises a control region (114) to provide control data (117, 117', 123, 123', 123'', 133, 143) to a receiver ($UE_1$, $UE_2$, RX) and a payload region (118) to provide payload data to the receiver ($UE_1$, $UE_2$, RX), and wherein payload data is allocated to the control region (114) of the data signal block;

receiving, at a mobile terminal of the wireless communication system, the data signal; and processing, by the mobile terminal, the symbols of the data signal block.

A 27$^{th}$ embodiment provides a method, comprising:

transmitting, by a transmitter (TX, $eNB_1$-$eNB_5$, 300) of a wireless communication device, a data signal, the data signal comprising at least one data signal block, the data signal block having a number of symbols in the time domain and a number of sub-carriers in the frequency domain, wherein the data signal block comprises a control region (114) to provide control data (117, 117', 123, 123', 123'', 133, 143) to a receiver ($UE_1$, $UE_2$, RX) and a payload region (118) to provide payload data to the receiver ($UE_1$, $UE_2$, RX), wherein the control data (117, 117', 123, 123', 123'', 133, 143) includes first control information and second control information, and wherein the first control information and the second control information are allocated to one or more common parts of the control region (114) of the data signal block by a superposition;

receiving, at a mobile terminal of the wireless communication system, the data signal; and processing, by the mobile terminal, the symbols of the data signal block.

A 28$^{th}$ embodiment provides a non-transitory computer program product comprising a computer readable medium storing instructions which, when executed on a computer, carry out the method of one of the 22$^{nd}$ embodiment to the 27$^{th}$ embodiment.

While this invention has been described in terms of several embodiments, there are alterations, permutations, and equivalents which fall within the scope of this invention.

It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A receiver for a wireless communication system, the receiver comprising:

one or more antennas, and a signal processor, wherein the receiver is configured to receive, using the one or more antennas, and process, using the signal processor, a data signal, the data signal comprising at least one data signal block, the data signal block comprising a number of symbols in the time domain and a number of sub-carriers in the frequency domain, wherein the data signal block comprises a control region to provide control data to the receiver and a payload region to provide payload data to the receiver, wherein payload data is allocated to the control region of the data signal block, wherein the control data is provided in a downlink control information, DCI, message associated with the payload data, wherein the payload data is not part of the DCI message but is located at different parts of the control region and is processed differently than the control data by using beamforming, wherein the DCI message indicates the one or more parts of the control region to which the payload data is allocated, wherein the DCI message includes first information informing the receiver how data allocated to the payload region is to be processed, and second information informing the receiver how the data at the different parts of the control region is to be processed, and wherein the second information includes information about a transmission scheme and/or a coding scheme and/or a modulation scheme used for forwarding the payload data to the receiver.

2. The receiver of claim 1, wherein resource elements of the data signal block are respectively defined by a symbol and a sub-carrier, and the payload data is allocated to one or more parts of the control region of the data signal block, a part of the control region comprising one or more resource elements.

3. The receiver of claim 1, wherein the control region is defined by one or more consecutive symbols at the beginning of the data signal block.

4. The receiver of claim 1, wherein the payload data allocated to the control region of the data signal block comprises delay critical user data.

5. The receiver of claim 1, wherein the control region of the data signal block comprises information indicating a receiver to which the payload data is directed.

6. The receiver of claim 5, wherein the information indicating the receiver to which the payload data is directed is separate from the control data or is part of the control data.

7. The receiver of claim 1, wherein the control data comprises data comprising control information for the receiver.

8. The receiver of claim 1, wherein the payload data is allocated to one of more consecutive parts of the control region that immediately follow the part of the control region to which the control data is allocated.

9. The receiver of claim 1, wherein the payload data is allocated to one or more separate parts of the control region that follow the part of the control region to which the control data is allocated.

10. The receiver of claim 1, wherein the payload data is allocated to one or more parts of the control region that are located between parts of the control region to which the control data of different receivers are allocated.

11. The receiver of claim 1, wherein the control data comprises control information for the receiver, and at least a part of the control data and the payload data are allocated to one or more common parts of the control region of the data signal block by a superposition.

12. A transmitter for a wireless communication system, the transmitter comprising:

one or more antennas, and a signal processor, wherein the transmitter is configured to transmit, using the one or more antennas, a data signal, the data signal provided using the signal processor and comprising at least one data signal block, the data signal block comprising a number of symbols in the time domain and a number of sub-carriers in the frequency domain, wherein the data signal block comprises a control region to provide control data to a receiver and a payload region to provide payload data to the receiver, wherein payload data is allocated to the control region of the data signal block, wherein the control data is provided in a downlink control information, DCI, message associated with the payload data, wherein the payload data is not part of the DCI message but is located at different parts of the control region and is processed differently than the control data by using beamforming, wherein the DCI message indicates the one or more parts of the control region to which the payload data is allocated, wherein the DCI message includes first information informing the receiver how data allocated to the payload region is to be processed, and second information informing the receiver how the data at the different parts of the control region is to be processed, and wherein the second information includes information about a transmission scheme and/or a coding scheme and/or a modulation scheme used for forwarding the payload data to the receiver.

13. A wireless communication system, comprising:

a receiver, wherein the receiver is configured to receive and process a data signal, the data signal comprising at least one data signal block, the data signal block comprising a number of symbols in the time domain and a number of sub-carriers in the frequency domain, wherein the data signal block comprises a control region to provide control data to the receiver and a payload region to provide payload data to the receiver, and wherein payload data is allocated to the control region of the data signal block; and a transmitter, wherein the transmitter is configured to transmit a data signal, the data signal comprising at least one data signal block, the data signal block comprising a number of symbols in the time domain and a number of sub-carriers in the frequency domain, wherein the data signal block comprises a control region to provide control data to a receiver and a payload region to provide payload data to the receiver, and wherein payload data is allocated to the control region of the data signal block, wherein the control data is provided in a downlink control information, DCI, message associated with the payload data, wherein the payload data is not part of the DCI message but is located at different parts of the control region and is processed differently than the control data by using beamforming, wherein the DCI message indicates the one or more parts of the control region to which the payload data is allocated, wherein the DCI message includes first information informing the receiver how data allocated to the payload region is to be processed, and second information informing the receiver how the data at the different parts of the control region is to be processed, and wherein the second information includes information about a transmission scheme and/or a coding scheme and/or a modulation scheme used for forwarding the payload data to the receiver.

14. A method, comprising:

providing for a receiver of a wireless communication system a data signal, the data signal comprising at least one data signal block, the data signal block comprising a number of symbols in the time domain and a number of sub-carriers in the frequency domain, wherein the data signal block comprises a control region to provide control data to the receiver and a payload region to provide payload data to the receiver, wherein payload data is allocated to the control region of the data signal block, wherein the control data is provided in a downlink control information, DCI, message associated with the payload data, wherein the payload data is not part of the DCI message but is located at different parts of the control region and is processed differently than the control data by using beamforming, wherein the DCI message indicates the one or more parts of the control region to which the payload data is allocated, wherein the DCI message includes first information informing the receiver how data allocated to the payload region is to be processed, and second information informing the receiver how the data at the different parts of the control region is to be processed, and wherein the second information includes information about a transmission scheme and/or a coding scheme and/or a modulation scheme used for forwarding the payload data to the receiver.

15. The method of claim 14, comprising:

receiving and processing the data signal by the receiver, and/or generating and transmitting the data signal by a transmitter of the wireless communication system.

16. A non-transitory digital storage medium having a computer program stored thereon to perform the method comprising:

providing for a receiver of a wireless communication system a data signal, the data signal comprising at least one data signal block, the data signal block comprising a number of symbols in the time domain and a number of sub-carriers in the frequency domain, wherein the data signal block comprises a control region to provide control data to the receiver and a payload region to provide payload data to the receiver, wherein payload data is allocated to the control region of the data signal block, wherein the control data is provided in a downlink control information, DCI, message associated with the payload data, wherein the payload data is not part of the DCI message but is located at different parts of the control region and is processed differently than the control data by using beamforming, wherein the DCI message indicates the one or more parts of the control region to which the payload data is allocated, wherein the DCI message includes first information informing the receiver how data allocated to the payload region is to be processed, and second information informing the receiver how the data at the different parts of the control region is to be processed, and wherein the second information includes information about a transmission scheme and/or a coding scheme and/or a modulation scheme used for forwarding the payload data to the receiver when said computer program is run by a computer.

* * * * *